United States Patent
Miao

(10) Patent No.: US 12,309,729 B2
(45) Date of Patent: May 20, 2025

(54) DOWNLINK (DL) TRANSMISSION TIMING OF INTEGRATED ACCESS AND BACKHAUL (IAB) NODE

(71) Applicant: Apple Inc., Cupertino, CA (US)

(72) Inventor: Honglei Miao, Munich (DE)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/365,872

(22) Filed: Aug. 4, 2023

(65) Prior Publication Data
US 2023/0397143 A1    Dec. 7, 2023

Related U.S. Application Data

(62) Division of application No. 17/278,211, filed as application No. PCT/US2019/054611 on Oct. 4, 2019, now Pat. No. 11,902,926.

(60) Provisional application No. 62/742,027, filed on Oct. 5, 2018.

(51) Int. Cl.
    *H04W 56/00* (2009.01)
(52) U.S. Cl.
    CPC .............. *H04W 56/0045* (2013.01)
(58) Field of Classification Search
    CPC . H04W 56/0045; H04W 56/00; H04W 16/28; H04W 84/04; H04W 88/08
    See application file for complete search history.

(56) References Cited

U.S. PATENT DOCUMENTS

| 2013/0260758 A1* | 10/2013 | Zhao | H04W 76/25 455/436 |
| 2014/0334399 A1* | 11/2014 | Xu | H04W 72/1268 370/329 |
| 2014/0355597 A1* | 12/2014 | Yeh | H04W 56/0045 370/350 |

(Continued)

FOREIGN PATENT DOCUMENTS

| WO | 2019245667 | 12/2019 | |
| WO | WO-2019245667 A1 * | 12/2019 | H04L 27/2666 |

OTHER PUBLICATIONS

International Search Report and Written Opinion for PCT/US2019/054611, Jan. 23, 2020.

(Continued)

*Primary Examiner* — Nathan S Taylor
(74) *Attorney, Agent, or Firm* — Kowert, Hood, Munyon, Rankin & Goetzel, P.C.

(57) ABSTRACT

A radio access node comprises one or more processors configured to determine a first reference timing of a first communication connection between the radio access node and a second, parent radio access node; determine a second reference timing of a second communication connection between the radio access node and a third, child radio access node; a memory storing the first and second reference timings; the one or more processors further configured to generate a request for the child radio access node to perform a timing advance adjustment based on the stored first and second reference timings, so that an uplink receive signal transmitted by the child radio access node arrives at the same time at the radio access node as a downlink receive signal transmitted by the parent radio access node arrives at the radio access node in case of frequency division multiplexed signals.

17 Claims, 11 Drawing Sheets

(56) References Cited

U.S. PATENT DOCUMENTS

| | | | |
|---|---|---|---|
| 2015/0189574 A1* | 7/2015 | Ng | H04W 52/245 370/254 |
| 2015/0189610 A1* | 7/2015 | Siomina | H04L 5/14 370/280 |
| 2016/0219475 A1* | 7/2016 | Kim | H04W 76/15 |
| 2017/0223757 A1* | 8/2017 | Tsuboi | H04W 76/25 |
| 2018/0034515 A1* | 2/2018 | Guo | H04B 7/0404 |
| 2018/0049190 A1 | 2/2018 | Abedini | |
| 2018/0206246 A1* | 7/2018 | Zhang | H04L 1/1896 |
| 2018/0220390 A1* | 8/2018 | Johansson | H04W 72/29 |
| 2018/0279334 A1* | 9/2018 | Lim | H04L 27/2607 |
| 2018/0310269 A1* | 10/2018 | Mayer | H04W 56/0045 |
| 2019/0045345 A1* | 2/2019 | Lee | H04L 1/1812 |
| 2019/0110266 A1* | 4/2019 | Abedini | H04L 45/04 |
| 2020/0037279 A1* | 1/2020 | Johansson | H04W 88/18 |
| 2020/0053682 A1* | 2/2020 | Abedini | H04W 56/0005 |
| 2020/0059879 A1* | 2/2020 | Nam | H04L 27/2666 |
| 2020/0128539 A1* | 4/2020 | Abedini | H04W 72/23 |
| 2020/0145079 A1* | 5/2020 | Marinier | H04W 72/23 |
| 2021/0058884 A1* | 2/2021 | Liu | H04J 3/06 |
| 2021/0195675 A1* | 6/2021 | Park | H04W 76/27 |
| 2021/0235247 A1* | 7/2021 | Lee | H04L 5/0053 |
| 2021/0250884 A1* | 8/2021 | Iyer | H04W 56/0045 |
| 2021/0321464 A1* | 10/2021 | Lin | H04W 76/11 |
| 2022/0039038 A1* | 2/2022 | Liu | H04W 56/0045 |

OTHER PUBLICATIONS

Qualcomm Incorporated "Enhancements to support NR back haul links"; R1-1811256, 3GPP TSG RAN WG1 Meeting #94bis, Oct. 8, 2018.

Qualcomm Incorporated "Network synchronization for multi-hop IAB", RI-1807396, 3GPP TSG RAN WG1 Meeting #93, May 21, 2018.

Nokia et al. "IAB synchronization", R1-1806664, 3GPP TSG RAN WG1 Meeting #93, May 21, 2018.

Huawei et al. "On IAB node synchronization and timing alignment", R1-1808087, 3GPP TSG RAN WG1 Meeting #94, Aug. 20, 2018.

Action for CN Patent Application No. 201980065732X; Jan. 26, 2024.

* cited by examiner

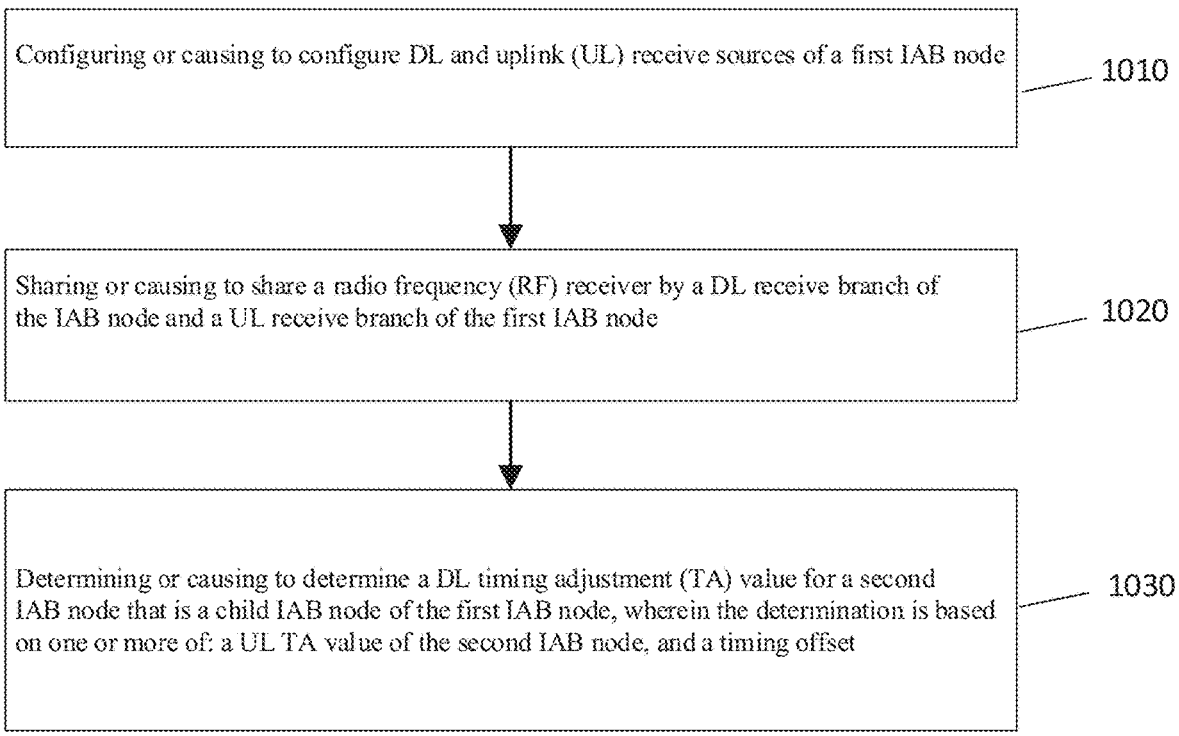

FIG.11                                                                 1100

Configuring or causing to configure DL and uplink (UL) receive sources of a first IAB node — 1110

Sharing or causing to share a radio frequency (RF) receiver by a DL receive branch of the IAB node and a UL receive branch of the first IAB node — 1120

Determining or causing to determine a DL timing adjustment (TA) value for a second IAB node that is a child IAB node of the first IAB node using a timing adjustment group (TAG), wherein the TAG is not based on or associated with a UL TA value of the second IAB node — 1130

DOWNLINK (DL) TRANSMISSION TIMING OF INTEGRATED ACCESS AND BACKHAUL (IAB) NODE

CROSS-REFERENCE TO RELATED APPLICATIONS

This application is a divisional application of U.S. patent application Ser. No. 17/278,211, titled "Downlink (DL) Transmission Timing of Integrated Access and Backhaul (IAB) Node", filed on Mar. 19, 2021, which is a national phase entry of International Application No. PCT/US2019/054611, titled "Downlink (DL) Transmission Timing of Integrated Access and Backhaul (IAB) Node", filed on Oct. 4, 2019, which is based on and claims the benefit of priority to U.S. Provisional Patent Application No. 62/742,027, titled "Downlink (DL) Transmission Timing of Integrated Access and Backhaul (IAB) Node," filed on Oct. 5, 2018, in the United States Patent and Trademark Office. The aforementioned Applicants are incorporated by reference in their entireties as though fully and completely set forth herein.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

TECHNICAL FIELD

Various aspects relate generally to the field of wireless communications.

BACKGROUND

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various aspects. However, it will be apparent to those skilled in the art having the benefit of the present disclosure that the various aspects of the various aspects may be practiced in other examples that depart from these specific details. In certain instances, descriptions of well-known devices, circuits, and methods are omitted so as not to obscure the description of the various aspects with unnecessary detail. For the purposes of the present document, the phrase "A or B" means (A), (B), or (A and B). An architecture includes, but is not limited to, a network topology. Examples of an architecture include, but is not limited to, a network, a network topology, and a system. Examples of a network include, but is not limited to, a time sensitive network (TSN), a core network (CN), any other suitable network known in the field of wireless communications, or any combination thereof.

One or more aspects described herein are related to one or more third generation partnership project (3GPP) specifications. Examples of these specifications include, but are not limited to, one or more 3GPP new radio (NR) specifications and one or more specifications directed and/or related to Radio Layer 1 (RAN1) and/or fifth generation (5G) mobile networks/systems.

According to RP-172290 of RAN #78 (Nov. 12, 2017) meeting, entitled "Study on integrated access and backhaul for NR," one of the potential technologies targeted to enable future cellular network deployment scenarios and applications is the support for wireless backhaul and relay links enabling flexible and very dense deployment of new radio (NR) cells without the need for densifying the transport network proportionately.

Moreover thanks to the expected larger bandwidth available for NR compared to Long Term Evolution (LTE) (e.g. mm Wave spectrum) along with the inherent deployment of massive Multiple Input Multiple Output (MIMO) or multi-beam systems, NR incorporates an excellent potential to deploy integrated access and backhaul (IAB) links. This may allow easier deployment of a dense network of self-backhauled NR cells in a more integrated manner by virtue of the control and data channels/procedures defined for providing access to User Equipment (UE). An example illustration of a network with such integrated access and backhaul links is shown in FIG. 1. Here, relay nodes also denoted as radio access nodes, i.e., IAB_N1 and IAB_N2, and in FIG. 1 referenced as "511 a or 511 b (511 a/b)" for the relaying radio access node 511 a/b and "106" for the child radio access node, can multiplex access and backhaul links in time, frequency, or space (e.g. beam-based operation). Further illustrated in FIG. 1 are a radio access node 102, e.g. a Next Generation NodeB (gNB) donor or parent radio access node, and a mobile radio communication terminal device 501 a or 501 b (501 a/b), e.g. a UE, and are described in more detail below. Further illustrated in FIG. 1 are communication connections (e.g. L_(p,DL)), in particular downlink (DL) connections (solid arrows) and uplink (UL) connections (dashed arrows), wherein index "p" denotes the connection between the parent radio access node 102 and the radio access node 511 a/b, and index "c" denotes the communication connection between the radio access node 511 a/b and the child radio access node 106. The radio communication connections are described in more detail below.

According to 3GPP RAN1-93, Chairman notes, the following alternatives/cases regarding IAB-node transmission and reception timing were captured:
 Case #1: DL transmission timing alignment across IAB nodes and donor nodes
 Case #2: DL and UL transmission timing is aligned within an IAB node
 Case #3: DL and UL reception timing is aligned within an IAB node
 Case #4: within an IAB node, when transmitting using case 2 while when receiving using case 3
 Case #5: Case 1 for access link timing and Case 4 for backhaul link timing within an IAB node in different time slot Moreover, according to 3GPP RAN1-94, Chairman notes, the list of above cases was extended with the following two cases:
 Case #6 (Case #1 DL transmission timing+Case #2 UL transmission timing):
  the DL transmission timing for all IAB nodes is aligned with the parent IAB node or donor DL timing (e.g. TA/2 adjustment as in Case #1)
  the UL transmission timing of an IAB node can be aligned with the IAB node's DL transmission timing Case #7 (Case #1 DL transmission timing+Case #3 UL reception timing):
    the DL transmission timing for all IAB nodes is aligned with the parent IAB node or donor DL timing (e.g. TA/2 adjustment as in Case #1)
    the UL reception timing of an IAB node can be aligned with the IAB node's DL reception timing
Due to the potential advantages of synchronous network deployment, it was agreed that timing according to case #1 should at least be supported.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects of the invention are described with reference to the following drawings, in which:

FIG. 10 illustrates a flow diagram of a process according to some example aspects.

FIG. 11 illustrates a flow diagram of a process according to some example aspects.

DESCRIPTION

Figure 1:
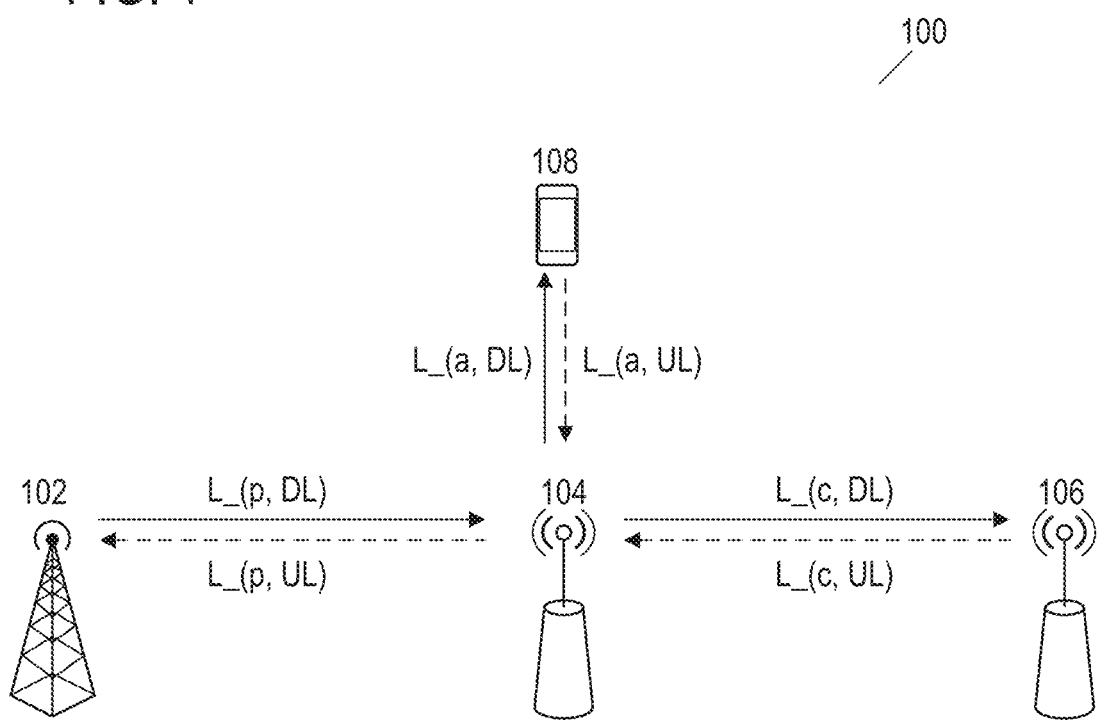
FIG. 1 illustrates an architecture of a system of a network in accordance with various aspects.

The following detailed description refers to the accompanying drawings that show, by way of illustration, specific details and aspects in which the invention may be practiced.

The word "exemplary" is used herein to mean "serving as an example, instance, or illustration". Any aspect or design described herein as "exemplary" is not necessarily to be construed as preferred or advantageous over other aspects or designs.

For one or more aspects, at least one of the components set forth in one or more of the preceding figures may be configured to perform one or more operations, techniques, processes, and/or methods as set forth in the example section below. For example, the baseband circuitry as described above in connection with one or more of the preceding FIGS. may be configured to operate in accordance with one or more of the examples set forth below. For another example, circuitry associated with a UE, base station, network element, etc. as described above in connection with one or more of the preceding FIGS. may be configured to operate in accordance with one or more of the examples set forth below in the example section.

Aspects described herein are directed to transmission timing adjustment techniques (e.g., methods, systems, apparatuses, etc.) for IAB intermediate nodes, i.e., the IAB child node whose parent node may be also an IAB node. The described aspects consider different scenarios with respect to DL and UL resource multiplexing and radio frequency (RF) receiver capability. Specifically, aspects described herein include one or more of the following.

In the following description, a (first) radio access node may be denoted as relay radio access node, IAB node or IAB-N1. A third, child radio access node may be denoted as IAB N2 or IAB child node; and a second, parent radio access node may be denoted as gNB donor or IAB donor. In FIG. 1-FIG. 4. the first, relay radio access node is denoted by 106, the child radio access node is denoted by 106, the parent radio access node is denoted by 102 and a mobile radio terminal device, e.g. a UE, is denoted by 108. Different reference numerals may be used for these components in FIGS. 5 to 16, as detailed below.

Aspects-1: FDMed DL and UL reception with same RF receiver: Here, the DL and UL receive sources of an IAB node are configured in frequency division multiplex (FDM) manner, and the DL and UL receive branch share the same radio frequency (RF) receiver. The DL timing advance (TA) value of its IAB child node shall be calculated by taking into account its UL TA value as well as an additional timing offset.

Aspect-2: TDMed DL and UL reception with same RF receiver: Here, the DL and UL receive sources of an IAB node are configured in TDM manner, and the DL and UL receive branch share the same RF receiver. The DL TA value of its IAB child node can be calculated by only taking into account its UL TA value.

This approach may be also applicable to the case where the IAB node has multiple RF receivers, the DL and UL receive sources of an IAB node are configured in FDM manner while and the DL and UL receive branches employ different RF beamformer settings for the respective RF receiver.

Aspect-3: Signaling of DL transmit (tx) time advance of IAB child-node: the following options can be used for the DL TA signaling of IAB child-node Option-1: DL TA signaling may be associated with the respective UL TA.

Option-2: DL TA signaling may be associated with a UL TA signal as well as an additional timing offset.

Option-3: DL TA may be configured as an independent TA group without the connection with UL TA.

The proposed methods enable IABs with different DL and UL resource multiplexing methods and different RF receiver constraints to transmit DL signal in approximately same time to achieve synchronous network.

Figure 2:
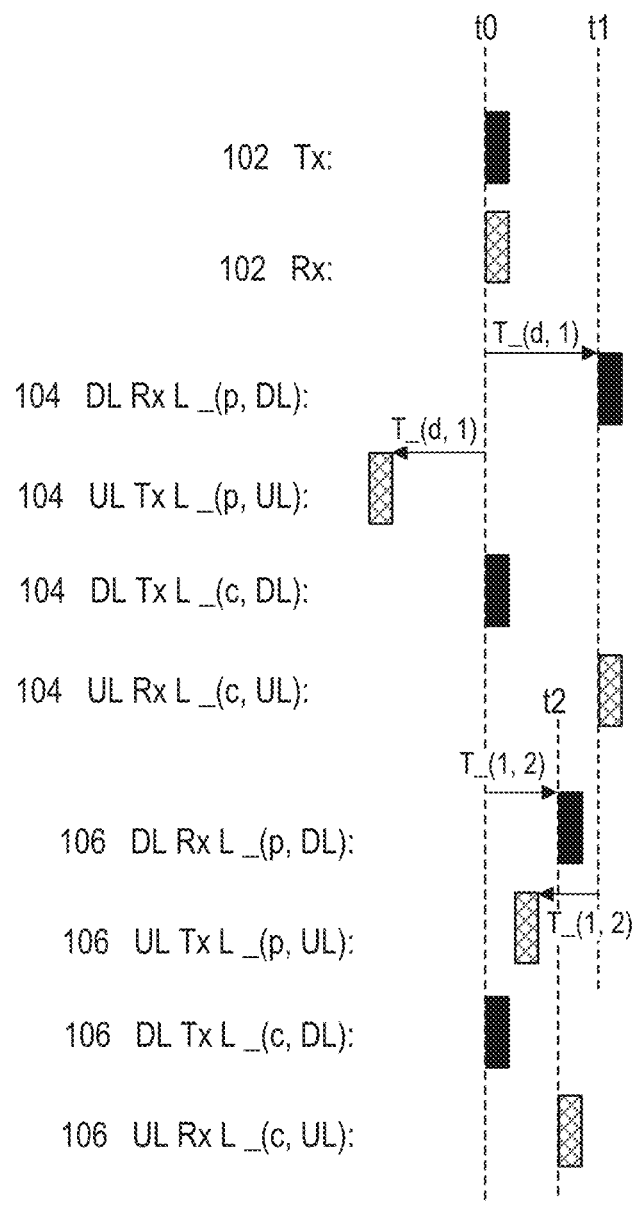
FIG. 2 illustrates a signal flow diagram in accordance with various aspects.
Figure 3:
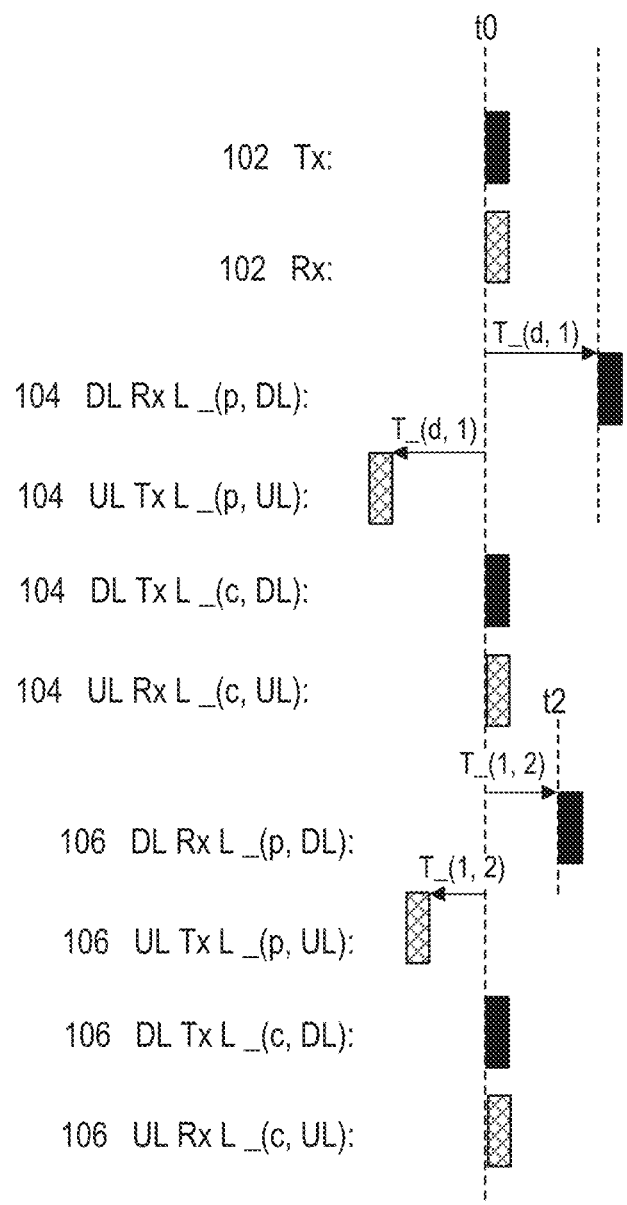
FIG. 3 illustrates a signal flow diagram in accordance with various aspects.

The following methods are proposed to adjust the DL tx timing of IAB-nodes to ensure the approximately same transmit timing for synchronous network. FIG. 2 and FIG. 3 illustrate timing diagrams, showing transmitted (Tx) and received (Rx) signals for downlink (DL) signals (filled rectangles corresponding to solid arrows in FIG. 1) and uplink (UL) signals (crossed-lines filling corresponding to dashed arrows in FIG. 1) for the radio access nodes illustrated in FIG. 1, e.g. a parent radio access node 102, a (relay) radio access node 104 and a child radio access node 106.

Further, different timings t0, t1 for receiving and/or transmitting a signal are illustrated in FIG. 2 and FIG. 3.

Aspect-1: FDMed DL and UL Reception with Same RF Receiver

As shown in FIG. 2, for IAB-N1 104 and IAB-N2 106, they use the same RF receiver for FDMed DL and UL reception. For IAB-N1 104, the DL receive (Rx) signal comes from gNB donor 102, and its receive timing may be full up to the gNB transmission timing and propagation delay $T_{(d,1)}$, and may be defined as $t_1$ in FIG. 2. The UL Tx timing advance for IAB-N1 104 signaled by gNB donor 102 can be calculated as follows $$T_{A,UL}^1 = 2T_{(d,1)} \tag{1}$$

In order to transmit DL signal around same time to as gNB donor 102, IAB-N1 104 can determine its DL tx timing with respect to its reference timing $t_1$ as follows $$T_{A,DL}^1 = T_{(d,1)} = \frac{T_{A,UL}^1}{3} \tag{2}$$

When FDMed rx signals from both gNB donor 102 and IAB-N2 106 in DL and UL respectively, are received simultaneously, to mitigate the unorthogonality caused by the misaligned arrival timing which can exceed the cyclic prefix, it may be plausible that IAB-N1 104 shall command IAB-N2 106 to perform a timing advance adjustment so that the UL rx signal from IAB-N2 106 can arrive at approximately same time as in DL rx signal from gNB donor 102. The reference timing of IAB-N2 106 defined as t2 may be determined by the arrival time of DL rx signal of IAB-N2 106 which comes from IAB-N1 104, as such the time advance value with respect to t2 signaled from IAB-N1 104 can be calculated as follows $$T_{A,UL}^2 = T_{(1,2)} - (T_{(d,1)} - T_{(1,2)}) = 2T_{(1,2)} - T_{(d,1)} \tag{3}$$

To achieve synchronous DL transmission, it follows from Eq. (3) that DL Tx timing of IAB-N2 106 with respect to $t_2$, can be calculated as follows $$T_{A,DL}^2 = T_{(1,2)} = \frac{T_{A,UL}^2 + T_{(d,1)}}{3} \tag{4}$$

It may be clear from Eq. (4) that the timing advance adjustment $T_{A,UL}^2$ for IAB-N2 106 DL transmission depends both TA value $T_{A,UL}^2$ for UL transmission as well as another parameter $T_{(d,1)}$ which may be the timing difference between DL Tx and UL Rx of IAB-N1 104.

Aspect-2: TDMed DL and UL Reception with Same RF Receiver

As shown in FIG. 3, for IAB-N1 104 and IAB-N2 106, they use the same RF receiver for TDMed DL and UL reception. Due to the similar reason, the DL and UL transmission time for IAB-N1 104 can be calculated as in Eqs (1) and (2), respectively.

When TDMed rx signals from both gNB donor 102 and IAB-N2 106 in DL and UL respectively, are received in different time so that they won't interfere each other, it may be plausible that IAB-N1 104 shall command IAB-N2 106 to perform a timing advance adjustment so that the UL rx signal from IAB-N2 106 can arrive at approximately same time as in DL Tx signal of IAB-N1 104 as shown in FIG. 3. The reference timing of IAB-N2 106 defined as $t_2$ may be determined by the arrival time of DL rx signal of IAB-N2 106 which comes from IAB-N1 104, as such the time advance value with respect to $t_2$ signaled from IAB-N1 104 can be calculated as follows $$T_{A,UL}^2 = 2T_{(1,2)} \tag{5}$$

To achieve synchronous DL transmission, it follows from Eq. (5) that DL Tx timing of IAB N2 106 with respect to $t_2$, can be calculated as follows $$T_{A,DL}^2 = T_{(1,2)} = \frac{T_{A,UL}^2}{3} \tag{6}$$

It may be clear from Eq. (6) that the timing advance adjustment $T_{A,DL}^2$ for IAB N2 106 DL transmission depends on only TA value $T_{A,UL}^2$ for UL transmission similar to IAB-N1 104 $T_{A,DL}^1$ with respect to $T_{A,UL}^1$.

It may be noted that the above $T_{A,DL}^2$ determination may be also valid to the scenario where IAB-N1 104 may be equipped with multiple RF frontends and applies different analog spatial beamformers for the receive signals from gNB donor 102 and IAB N2 106 so that the baseband receive signals of gNB donor 102 and IAB N2 106 won't interfere each other. For example, as illustrated in FIG. 1, it may be very likely that different receive beamformers would be required for receiving the signals from gNB donor 102 and IAB N2 106 due to very different angles of arrival signals.

Aspect-3: Signaling of DL Tx Time Advance of IAB Child-Node

Depending on the DL and UL resource configuration and the receiver beamformer setup of IAB node (e.g., IAB-N1 104 in FIG. 1), in the case of Aspect-1, the DL tx timing advance $T_{A,DL}^2$ of its IAB child node, i.e., IAB N2 106, needs to be calculated as in Eq. (4) by using $T_{A,UL}^2$ as well as an additional parameter $T_{(d,1)}$. However, and depending on the DL and UL resource configuration and the receiver beamformer setup of IAB node (e.g., IAB-N 1 104 in FIG. 1), in case of Aspect-2, the DL tx timing advance $T_{A,DL}^2$ of its IAB child node depends only on $T_{A,UL}^2$ as in Eq. (6). In some scenario, both methods can be required. For example, IAB-N1 104 has two IAB child-nodes, namely IAB N2 106-1 and IAB-N3 106-2 (illustrated in FIG. 4 for the middle radio access node 104), if DL rx resources from gNB donor 102 may be FDMed with UL rx resource from IAB N2 106, however the DL rx resources from gNB donor 102 may be TDMed with the UL rx resources from IAB-N3, and the same RF beamformer may be used for receiving signals from both gNB donor 102 and IAB N2 106, the TA value of IAB N2 106 DL tx shall be calculated according to Eq. (4) while the TA value of IAB-N3 DL Tx shall be calculated by Eq. (6). As a result, it would require the TA value for IAB child-node to be configured by using UE-specific signaling.

The DL tx timing of IAB child node can be determined by the following methods. In one aspect, the DL tx timing $T_{A,DL}^2$ originated from the IAB child-node can be configured to be associated with the UL transmission timing $T_{A,UL}^2$ of the IAB child node according to Eq. (6). In another aspect, the DL tx timing $T_{A,DL}^2$ originated from the IAB child-node can be configured to be associated with the UL transmission timing $T_{A,UL}^2$ of the IAB child node as well as an additional signaled timing offset value $T_{(d,1)}$, according to Eq. (4). In yet another aspect, the DL tx timing $T_{A,DL}^2$ originated from the IAB child-node can be configured with a standalone TA value without assuming connection with the respective UL TA. With this approach, the DL cell originated from IAB child node may be signaled as a different TA group (TAG) than the respective UL transmission of IAB child node. As a result, the IAB child node can adjust the DL and UL transmission timing separately.

Integrated Access and Backhaul (IAB) Aspects

Figure 4:
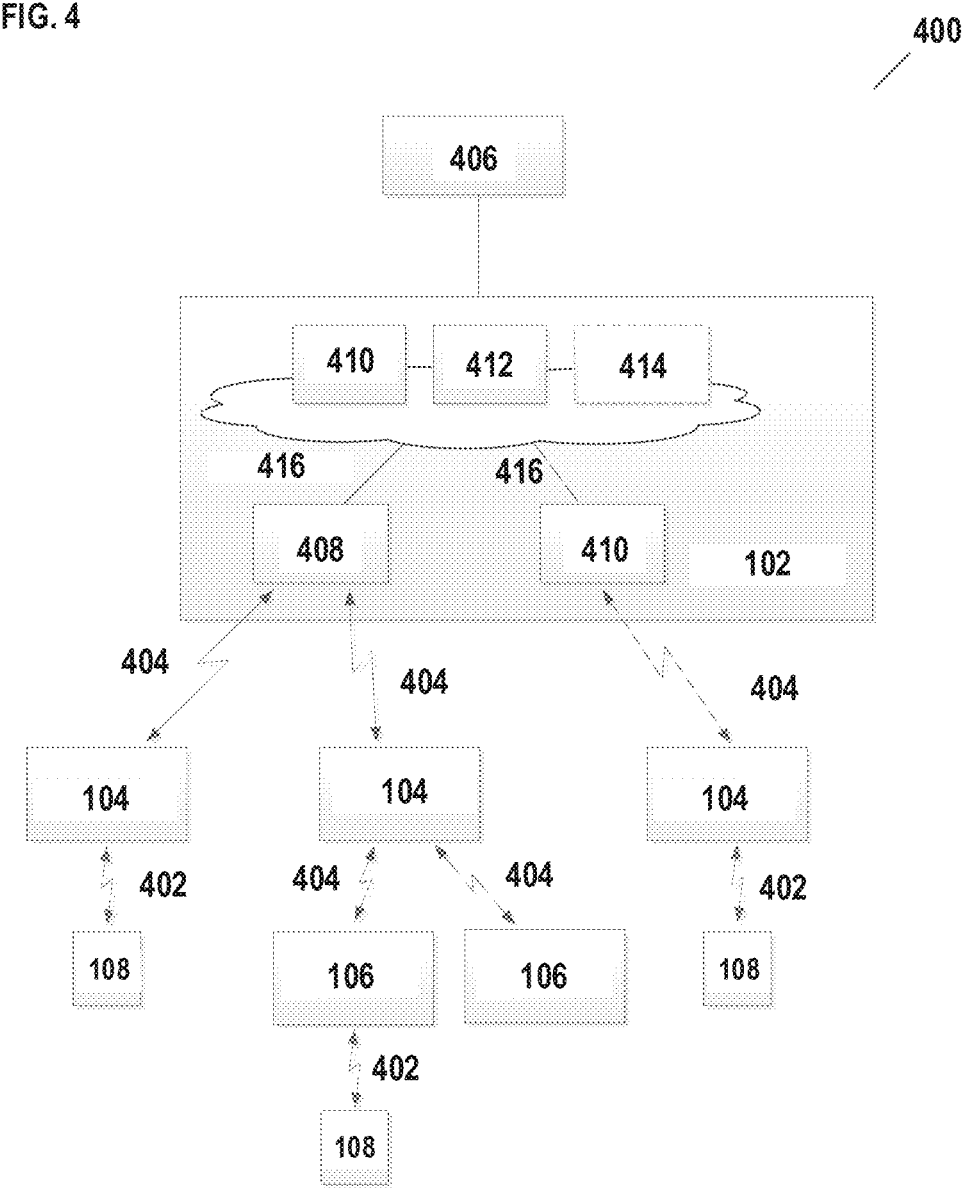
FIG. 4 illustrates an example of infrastructure equipment in accordance with various aspects.

FIG. 4 shows an example Integrated Access and Backhaul (IAB) architecture 400 (standalone operation (SA) mode) in accordance with various aspects. The IAB architecture of FIG. 4 may use the same infrastructure and spectral resources for both access communications 402 and backhaul communications 404. FIG. 4 shows a reference diagram for IAB in standalone mode, which contains one IAB donor 102 (also referred to as an "anchor node" or the like) and multiple IAB nodes 104 (also referred to as IAB relay nodes (RNs), relay Transmission/Reception Points (rTRPs), or the like). The IAB donor 102 may be treated as a single logical node that includes a set of functions such as gNB-DU (gNB-distributed unit, Next Generation NodeB distributed unit) 416, gNB-CU-CP (gNB-centralized unit, Next Generation NodeB centralized unit) 410, gNB-CU-UP 412 and potentially other functions 414. In some implementations, the IAB donor 102 can be split according to the aforementioned functions, which can all be either collocated or non-collocated as allowed by 3GPP NG-RAN architecture. Some of the functions presently associated with the IAB donor 102 may be moved outside of the IAB donor 102.

In FIG. 4, various UEs 108 (e.g., UEs 501, 601, and 701 in FIGS. 5, 6, and 7 discussed infra) access IAB nodes 104, 106-1/2. An IAB node 104, 106-1/2 may be a network node in an IAB deployment having UE 108 and (at least part of) gNB functions. As shown by FIG. 4, some IAB nodes 106-1/2 access other IAB 104 nodes, and some IAB nodes 104 access an IAB donor 102. An IAB donor 102 may be a network node in an IAB deployment that terminates NG (Next Generation. Next Gen) interfaces via wired connection(s). The IAB donor 102 may be a radio access network (RAN) node that provides a UE's interface to a core network CN 406 (e.g., the 5GC (5G Core network) in FIG. 4 and CN 520 in FIG. 5 discussed infra) and wireless backhauling functionality to IAB nodes 104. An IAB node may be a relay node and/or a RAN node that supports wireless access to UEs 108 and wirelessly backhaul access traffic.

IAB strives to reuse existing functions and interfaces defined for access. In particular, Mobile-Termination (MT), gNB-DU, gNB-CU, UPF, AMF (Access and Mobility Management Function) and session management function (SMF) as well as the corresponding interfaces NR Uu (between mobile terminal (MT) and gNB), F1, NG, X2 and N4 are used as baseline for the IAB architectures. Modifications or enhancements to these functions and interfaces for the support of IAB will be explained in the context of the architecture discussion. The Mobile-Termination (MT) function has been defined a component of the Mobile Equipment. In the context of IAB, MT may be referred to as a function residing on an IAB node that terminates the radio interface layers of the backhaul Uu interface toward the IAB donor or other IAB nodes. Additional functionality, such as multi-hop forwarding, may be included in the architecture.

IAB nodes can operate in SA or in non-standalone operation mode (NSA) mode. When operating in NSA, the IAB node only uses the NR link for backhauling. The UE 108 connecting to an IAB node 104, 106-1/2, e.g. via wireless access link 402, may choose a different operation mode than the IAB node 104, 106-1, 106-2. The UE 108 may further connect to a different type of core network 406 than the IAB node 104, 106-1/2 it may be connected to. In this case, (e) Decor or slicing can be used for CN selection. IAB nodes operating in NSA mode may be connected to the same or to different evolved NodeBs (eNB). UEs that also operate in NSA-node may connect to the same or to a different eNB than the IAB node to which they are connected.

Examples for operation in SA and NSA mode include: (1) the UEs and IAB nodes operate in SA with NGC: (2) UEs operate in NSA with evolved packet core (EPC) while IAB nodes operates in SA with NGC; and (3) UEs and IAB nodes operate in NSA with EPC. For the third example, the UEs and IAB nodes operate in NSA with EPC, and the IAB node may use the LTE leg for IAB node initial access and configuration, topology management, route selection, and resource partitioning.

In aspects where multi-hop and topology adaptation are supported, the IAB nodes include topology management mechanisms and route selection and optimization (RSO) mechanisms. Topology management mechanisms include protocol stacks, interfaces between rTRPs or IAB nodes, control and user plane procedures for identifying one or more hops in the IAB network, forwarding traffic via one or multiple wireless backhaul links in the IAB network, handling of quality of service (QOS), and the like. The RSO mechanisms include mechanisms for discovery and management of backhaul links for TRPs with integrated backhaul and access functionalities; RAN-based mechanisms to support dynamic route selection (potentially without core network involvement) to accommodate short-term blocking and transmission of latency-sensitive traffic across backhaul links; and mechanisms for evaluating different resource allocations/routes across multiple nodes for end-to-end RSO.

The operation of the different links may be on the same frequencies ("in-band") or different frequencies ("out-of-band"). In-band backhauling includes scenarios where access and backhaul links at least partially overlap in frequency creating half-duplexing or interference constraints, which may imply that an IAB node may not transmit and receive simultaneously on both links. By contrast, out-of-band scenarios may not have such constraints. In aspects, one or more of the IAB nodes include mechanisms for dynamically allocating resources between backhaul and access links, which include mechanisms to efficiently multiplex access and backhaul links (for both DL and UL directions) in time, frequency, or space under a per-link half-duplex constraint across one or multiple backhaul link hops for both time division duplex (TDD) and frequency division duplex (FDD) operation; and cross-link interference (CLI) measurement, coordination and mitigation between rTRPs and UEs.

Architecture Groups and Types

There are five different types of IAB architectures that are divided into two architecture groups. Architecture group 1 includes architectures 1a and 1b, which include CU/DU split architectures. Architecture 1a includes backhauling of F1 user plane interface (F1-U) uses an adaptation layer or GPRS tunnelling protocol for user plane (GTP-U) combined with an adaptation layer, and hop-by-hop forwarding across intermediate nodes uses the adaptation layer for operation with NGC or PDN (Packet Data Network, Public Data Network)-connection-layer routing for operation with EPC. Architecture 1b includes backhauling of F1-U on access node uses GTP-U/UDP (User Datagram Protocol)/IP, and hop-by-hop forwarding across intermediate node uses the adaptation layer.

Architecture group 2 includes architectures 2a, 2b and 2c. Architecture 2a includes backhauling of F1-U or NG-U on access node uses GTP-U/UDP/IP, and hop-by-hop forwarding across intermediate node uses PDU-session-layer routing. Architecture 2b includes backhauling of F1-U or NG-U on access node uses GTP-U/UDP/IP, and hop-by-hop forwarding across intermediate node uses GTP-U/UDP/Internet Protocol (IP) nested tunnelling. Architecture 2c includes backhauling of F1-U or NG-U on access node uses GTP-U/UDP/IP, and hop-by-hop forwarding across intermediate node uses GTP-U/UDP/IP/PDCP nested tunnelling.

Architecture Group 1

Architecture 1a leverages CU/DU-split architecture. In this architecture, each IAB node holds a DU and an MT. Via the MT, the IAB node connects to an upstream IAB node or the IAB donor. Via the DU, the IAB node establishes radio link control (RLC)-channels to UEs and to MTs of downstream IAB nodes. For MTs, this RLC-channel may refer to a modified RLC*. An IAB node can connect to more than one upstream IAB node or IAB donor DU. The IAB node may contain multiple DUs, but each DU part of the IAB node has F1 control plane interface (F1-C) connection only with one IAB donor CU-CP.

The donor also holds a DU to support UEs and MTs of downstream IAB nodes. The IAB donor holds a CU for the DUs of all IAB nodes and for its own DU. It may be for further study (FFS) if different CUs can serve the DUs of the IAB nodes. Each DU on an IAB node connects to the CU in the IAB donor using a modified form of F1, which may be referred to as F1*F1*-U runs over RLC channels on the wireless backhaul between the MT on the serving IAB node and the DU on the donor. F1*-U transport between MT and DU on the serving IAB node as well as between DU and CU on the donor may be FFS. An adaptation layer may be added, which holds routing information, enabling hop-by-hop forwarding. It replaces the IP functionality of the standard F1-stack. F1*-U may carry a GTP-U header for the end-to-end association between CU and DU. In a further enhancement, information carried inside the GTP-U header may be included into the adaption layer. Further, optimizations to RLC may be considered such as applying ARQ (Automatic Repeat Request) only on the end-to-end connection opposed to hop-by-hop. The F1*-U protocol stacks for this architecture include enhancements of RLC (referred to as RLC*). The MT of each IAB node further sustains NAS (Non-Access Stratum, Non-Access Stratum layer) connectivity to the NGC, e.g., for authentication of the IAB node, and sustains a PDU-session via the NGC, e.g., to provide the IAB node with connectivity to the OAM.

For NSA operation with EPC, the MT may be dual-connected with the network using evolved UMTS Terrestrial Radio Access (E-UTRA)-NR dual connectivity (EN-DC). The IAB node's MT sustains a PDN connection with the EPC. e.g., to provide the IAB node with connectivity to the OAM.

Architecture 1b also leverages CU/DU-split architecture. In this architecture, the IAB donor only holds one logical CU. An IAB node can connect to more than one upstream IAB node or IAB donor DU. The IAB node may contain multiple DUs, but each DU part of the IAB node has F1-C connection only with one IAB donor CU-CP.

In this architecture, each IAB node and the IAB donor hold the same functions as in architecture 1a. Also, as in architecture 1a, every backhaul link establishes an RLC-channel, and an adaptation layer may be inserted to enable hop-by-hop forwarding of F1*.

Opposed to architecture 1a, the MT on each IAB node establishes a PDU-session with a UPF residing on the donor. The MT's PDU-session carries F1* for the collocated DU. In this manner, the PDU-session provides a point-to-point link between CU and DU. On intermediate hops, the PDCP-PDUs of F1* are forwarded via adaptation layer in the same manner as described for architecture 1a.

For NSA operation with EPC, the MT may be dual-connected with the network using EN-DC. In this case, the IAB node's MT sustains a PDN connection with a L-GW residing on the donor.

Architecture Group 2

In architecture 2a, UEs and IAB nodes use SA-mode with NGC. In this architecture, the IAB node holds an MT to establish an NR Uu link with a gNB on the parent IAB node or IAB donor. Via this NR-Uu link, the MT sustains a PDU-session with a UPF that may be collocated with the gNB. In this manner, an independent PDU-session may be created on every backhaul link. Each IAB node further supports a routing function to forward data between PDU-sessions of adjacent links. This creates a forwarding plane across the wireless backhaul. Based on PDU-session type, this forwarding plane supports IP or Ethernet. In case PDU-session type may be Ethernet, an IP layer can be established on top. In this manner, each IAB node obtains IP-connectivity to the wireline backhaul network. An IAB node can connect to more than one upstream IAB node or IAB donor.

All IP-based interfaces such as NG, Xn, F1, N4, etc. are carried over this forwarding plane. In the case of F1, the UE-serving IAB node would contain a DU for access links in addition to the gNB and UPF for the backhaul links. The CU for access links would reside in or beyond the IAB Donor. The NG-U protocol stack for IP-based and for Ethernet-based PDU-session type may be used for this architecture.

In case the IAB node holds a DU for UE-access, it may not be required to support PDCP-based protection on each hop since the end user data will already be protected using end to end PDCP between the UE and the CU. Details are FFS.

For NSA operation with EPC, the MT may be dual-connected with the network using EN-DC. In this case, the IAB node's MT sustains a PDN-connection with a L-GW residing on the parent IAB node or the IAB donor. All IP-based interfaces such as S1, S5, X2, etc. are carried over this forwarding plane.

In architecture 2b, the IAB node holds an MT to establish an NR Uu link with a gNB on the parent IAB node or IAB donor. Via this NR-Uu link, the MT sustains a PDU-session with a UPF. Opposed to architecture 2a, this UPF may be located at the IAB donor. Also, forwarding of PDUs across upstream IAB nodes may be accomplished via tunnelling. The forwarding across multiple hops therefore creates a stack of nested tunnels. As in architecture 2a, each IAB node obtains IP-connectivity to the wireline backhaul network. All IP-based interfaces such as NG, Xn, F1, N4, etc. are carried over this forwarding IP plane. An IAB node can connect to more than one upstream IAB node or IAB donor.

For NSA operation with EPC, the MT may be dual-connected with the network using EN-DC. In this case, the IAB node's MT sustains a PDN-connection with a L-GW residing on the IAB donor.

Architecture 2c leverages DU-CU split. The IAB node holds an MT which sustains an RLC-channel with a DU on the parent IAB node or IAB donor. The IAB donor holds a CU and a UPF for each IAB node's DU. The MT on each IAB node sustains a NR-Uu link with a CU and a PDU session with a UPF on the donor. Forwarding on intermediate nodes may be accomplished via tunnelling. The forwarding across multiple hops creates a stack of nested tunnels. As in architecture 2a and 2b, each IAB node obtains IP-connectivity to the wireline backhaul network. Opposed to architecture 2b, however, each tunnel includes an SDAP/PDCP layer. All IP-based interfaces such as NG, Xn, F1, N4, etc. are carried over this forwarding plane. An IAB node can connect to more than one upstream IAB node or IAB donor.

For NSA operation with EPC, the MT may be dual-connected with the network using EN-DC. In this case, the IAB node's MT sustains a PDN-connection with a L-GW residing on the IAB donor.

Multi-Hop Backhauling

In aspects, the IAB system architecture supports multi-hoping backhauling. IAB multi-hop backhauling provides more range extension than single hopping systems. Multi-hop backhauling further enables backhauling around obstacles (e.g., buildings in urban environment for in-clutter deployments). The maximum number of hops in a deployment may depend on many factors such as frequency, cell density, propagation environment, traffic load, various key performance indicators (KPI), and/or other like factors. Additionally, the weights assigned to each of these factors may change dynamically over time. With increasing number of hops, scalability issues may arise and limit performance or increase signaling load to unacceptable levels; therefore, scalability to hop-count may be considered as an important KPI for planning and deployment (e.g., self-organizing network (SON)) purposes. In some implementations, there may be no limits on the number of backhaul hops.

Topology Adaptation

The IAB system architecture also supports topology adaptation. Topology adaptation refers to procedures that autonomously reconfigure the backhaul network under circumstances, such as blockage or local congestion without discontinuing services for UEs and/or to mitigate service disruption for UEs. For example, wireless backhaul links may be vulnerable to blockage due to moving objects such as vehicles, weather-related events (e.g., seasonal changes (foliage)), infrastructure changes (e.g., new buildings), and/or the like. These vulnerabilities may apply to physically stationary IAB nodes and/or mobile IAB nodes. Also, traffic variations can create uneven load distribution on wireless backhaul links leading to local link or node congestion. In various implementations, topology adaptation for physically fixed IAB nodes may be supported to enable robust operation to mitigate blockage and load variation on backhaul links.

Systems and Implementations

Figure 5:
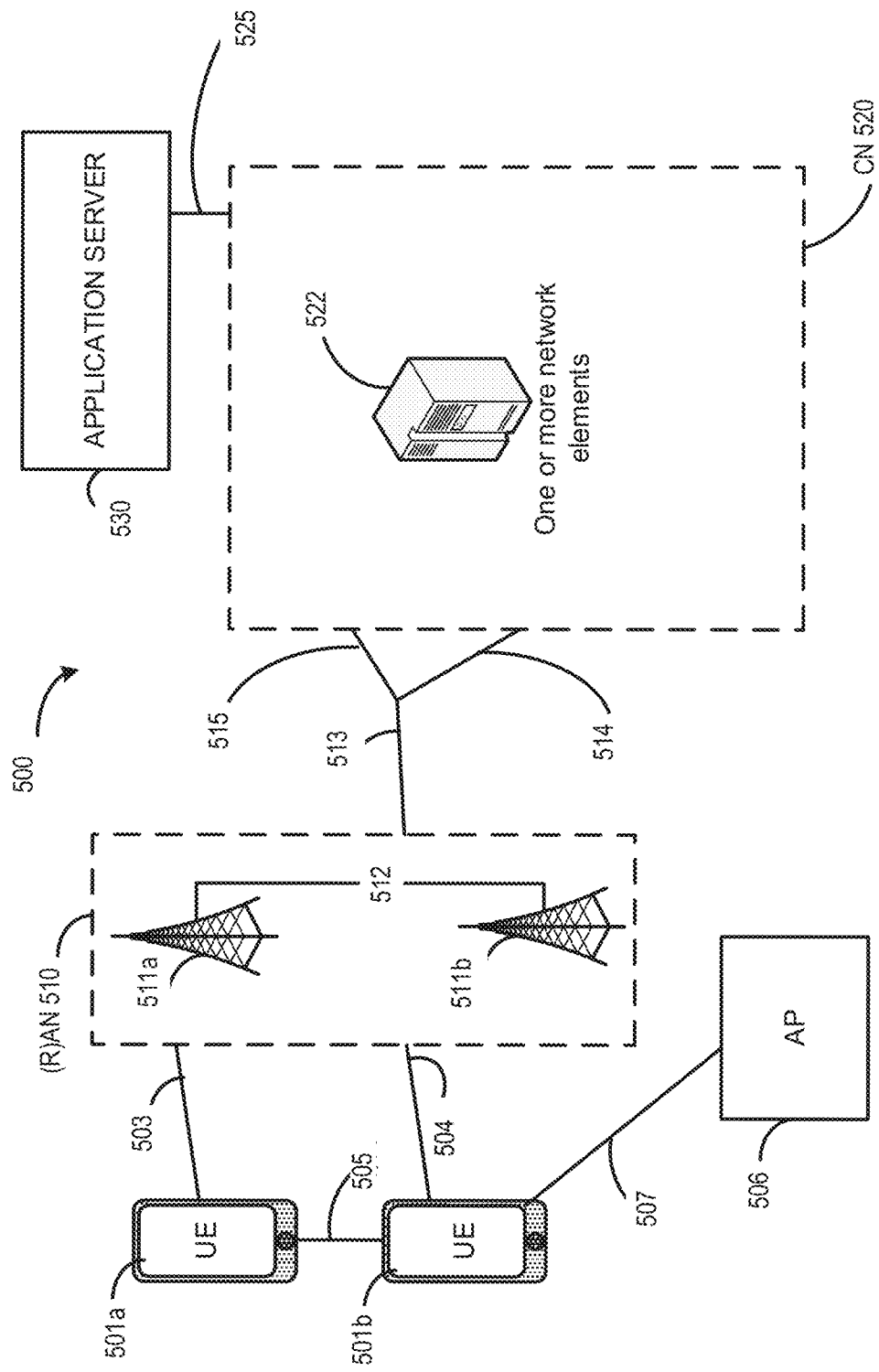
FIG. 5 illustrates an example architecture of a system of a network, in accordance with various aspects.

FIG. 5 illustrates an example architecture of a system 500 of a network, in accordance with various embodiments. The following description is provided for an example system 500 that operates in conjunction with the LTE system standards and 5G or NR system standards as provided by 3GPP technical specifications. However, the example embodiments are not limited in this regard and the described embodiments may apply to other networks that benefit from the principles described herein, such as future 3GPP systems (e.g., Si8h Generation (6G)) systems, IEEE 802.16 protocols (e.g., WMAN, worldwide interoperability for microwave access (WiMAX), etc.), or the like.

As shown by FIG. 5, the system 500 includes UE 501 a and UE 501 b (collectively referred to as "UEs 501" or "UE 501"). In this example, UEs 501 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, Machine-Type Communications (MTC) devices, Machine-to-Machine (M2M), Internet of Things (IoT) devices, and/or the like.

In some embodiments, any of the UEs 501 may be IoT UEs, which may comprise a network access layer designed for low-power IoT applications utilizing short-lived UE connections. An IoT UE can utilize technologies such as M2M or MTC for exchanging data with an MTC server or device via a public land mobile network (PLMN), ProSe (Proximity Services, Proximity-Based Service) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 501 may be configured to connect, for example, communicatively couple, with an or RAN 510. In embodiments, the RAN 510 may be an NG RAN or a 5G RAN, an evolved universal terrestrial radio access network (E-UTRAN), or a legacy RAN, such as a UTRAN or GERAN (GSM EDGE RAN, Global System for Mobile Communications (GSM) EDGE Radio Access Network). As used herein, the term "NG RAN" or the like may refer to a RAN 510 that operates in an NR or 5G system 500, and the term "E-UTRAN" or the like may refer to a RAN 510 that operates in an LTE or 4G (Fourth Generation) system 500. The UEs 501 utilize connections (or channels) 503 and 504, respectively, each of which comprises a physical communications interface or layer (discussed in further detail below).

In this example, the connections 503 and 504 are illustrated as an air interface to enable communicative coupling, and can be consistent with cellular communications protocols, such as a GSM protocol, a code-division multiple access (CDMA) network protocol, a Push-to-Talk (PTT) protocol, a PTT over cellular (POC) protocol, an universal mobile telecommunications system (UMTS) protocol, a 3GPP LTE protocol, a 5G protocol, a NR protocol, and/or any of the other communications protocols discussed herein. In embodiments, the UEs 501 may directly exchange communication data via a ProSe interface 505. The ProSe interface 505 may alternatively be referred to as a sidelink (SL) interface 505 and may comprise one or more logical channels, including but not limited to a physical sidelink control channel (PSCCH), a physical sidelink shared channel (PSSCH), a physical sidelink downlink channel (PSDCH), and a physical sidelink broadcast channel (PSBCH).

The UE 501 b is shown to be configured to access an AP (Antenna Port, Access Point) 506 (also referred to as "WLAN (wireless local area network) node 506", "WLAN 506", "WLAN Termination 506", "WT 506" or the like) via connection 507. The connection 507 can comprise a local wireless connection, such as a connection consistent with any IEEE 802.11 protocol, wherein the AP 506 would comprise a wireless fidelity (Wi-Fi®) router. In this example, the AP 506 is shown to be connected to the Internet without connecting to the core network of the wireless system (described in further detail below). In various embodiments, the UE 501 *b*, RAN 510, and AP 506 may be configured to utilize LTE-WLAN aggregation (LWA) operation and/or LTE/WLAN Radio Level Integration with IPsec Tunnel (LWIP) operation. The LWA operation may involve the UE 501 *b* in RRC_CONNECTED being configured by a RAN node 511 *a-b* to utilize radio resources of LTE and WLAN. LWIP operation may involve the UE 501 *b* using WLAN radio resources (e.g., connection 507) via Internet Protocol Security (IPsec) protocol tunneling to authenticate and encrypt packets (e.g., IP packets) sent over the connection 507. IPsec tunneling may include encapsulating the entirety of original IP packets and adding a new packet header, thereby protecting the original header of the IP packets.

The RAN 510 can include one or more AN nodes or RAN nodes 511 *a* and 511 *b* (collectively referred to as "RAN nodes 511" or "RAN node 511") that enable the connections 503 and 504. As used herein, the terms "access node," "access point," or the like may describe equipment that provides the radio baseband functions for data and/or voice connectivity between a network and one or more users. These access nodes can be referred to as base station (BS), gNBs, RAN nodes, eNBs, NodeBs, road side units (RSU). TRxPs or TRPs (Transmission Reception Point), and so forth, and can comprise ground stations (e.g., terrestrial access points) or satellite stations providing coverage within a geographic area (e.g., a cell). As used herein, the term "NG RAN node" or the like may refer to a RAN node 511 that operates in an NR or 5G system 500 (for example, a gNB), and the term "E-UTRAN node" or the like may refer to a RAN node 511 that operates in an LTE or 4G system 500 (e.g., an eNB). According to various embodiments, the RAN nodes 511 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some embodiments, all or parts of the RAN nodes 511 may be implemented as one or more software entities running on server computers as part of a virtual network, which may be referred to as a CRAN (Cloud Radio Access Network, Cloud RAN) and/or a virtual baseband unit pool (vBBUP). In these embodiments, the CRAN or vBBUP may implement a RAN function split, such as a PDCP split wherein radio resource control (RRC) and PDCP layers are operated by the CRAN/vBBUP and other Layer 2 (data link layer-L2) protocol entities are operated by individual RAN nodes 511; a MAC/PHY (Physical layer) split wherein RRC, PDCP. RLC, and MAC (Medium Access Control (protocol layering context)) layers are operated by the CRAN/vBBUP and the PHY layer is operated by individual RAN nodes 511; or a "lower PHY" split wherein RRC, PDCP, RLC, MAC layers and upper portions of the PHY layer are operated by the CRAN/vBBUP and lower portions of the PHY layer are operated by individual RAN nodes 511. This virtualized framework allows the freed-up processor cores of the RAN nodes 511 to perform other virtualized applications. In some implementations, an individual RAN node 511 may represent individual gNB-DUs that are connected to a gNB-CU via individual F1 interfaces (not shown by FIG. 5). In these implementations, the gNB-DUs may include one or more remote radio heads or RFEMs (see, e.g., FIG. 6), and the gNB-CU may be operated by a server that is located in the RAN 510 (not shown) or by a server pool in a similar manner as the CRAN/vBBUP. Additionally or alternatively, one or more of the RAN nodes 511 may be ne8 generation eNBs (ng-eNBs), which are RAN nodes that provide E-UTRA user plane and control plane protocol terminations toward the UEs 501, and are connected to a 5GC via an NG interface (discussed infra).

In vehicle-to-everything (V2X) scenarios one or more of the RAN nodes 511 may be or act as RSUs. The term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs 501 (vUEs 501). The RSU may also include internal data storage circuitry to store intersection map geometry, traffic statistics, media, as well as applications/software to sense and control ongoing vehicular and pedestrian traffic. The RSU may operate on the 5.9 GHZ Direct Short Range Communications (DSRC) band to provide very low latency communications required for high speed events, such as crash avoidance, traffic warnings, and the like. Additionally or alternatively, the RSU may operate on the cellular V2X band to provide the aforementioned low latency communications, as well as other cellular communications services. Additionally or alternatively, the RSU may operate as a Wi-Fi hotspot (2.4 GHz band) and/or provide connectivity to one or more cellular networks to provide uplink and downlink communications. The computing device(s) and some or all of the radiofrequency circuitry of the RSU may be packaged in a weatherproof enclosure suitable for outdoor installation, and may include a network interface controller to provide a wired connection (e.g., Ethernet) to a traffic signal controller and/or a backhaul network.

Any of the RAN nodes 511 can terminate the air interface protocol and can be the first point of contact for the UEs 501. In some embodiments, any of the RAN nodes 511 can fulfill various logical functions for the RAN 510 including, but not limited to, radio network controller (RNC) functions such as radio bearer management, uplink and downlink dynamic radio resource management and data packet scheduling, and mobility management.

In embodiments, the UEs 501 can be configured to communicate using orthogonal frequency division multiplexing (OFDM) communication signals with each other or with any of the RAN nodes 511 over a multicarrier communication channel in accordance with various communication techniques, such as, but not limited to, an OFDMA communication technique (e.g., for downlink communications) or a single carrier frequency division multiple access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 511 to the UEs 501, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

According to various embodiments, the UEs 501, 502 and the RAN nodes 511, 512 communicate data (for example, transmit and receive) data over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band.

To operate in the unlicensed spectrum, the UEs 501, 502 and the RAN nodes 511, 512 may operate using licensed assisted access (LAA), enhanced licensed assisted access (eLAA), and/or further enhanced licensed assisted access (feLAA) mechanisms. In these implementations, the UEs 501, 502 and the RAN nodes 511, 512 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UEs 501, 502, RAN nodes 511, 512, etc.) senses a medium (for example, a channel or carrier frequency) and transmits when the medium is sensed to be idle (or when a specific channel in the medium is sensed to be unoccupied). The medium sensing operation may include clear channel assessment (CCA), which utilizes at least energy detection (ED) to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called carrier sense multiple access with collision avoidance (CSMA/CA). Here, when a WLAN node (e.g., a mobile station (MS) such as UE 501 or 502, AP 506, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the contention window size (CWS), which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including physical downlink shared channel (PDSCH) or physical uplink shared channel (PUSCH) transmissions, respectively, may have an LAA contention window that is variable in length between X and Y extended clear channel assessment (ECCA) slots, where X and Y are minimum and maximum values for the CWSs for LAA. In one example, the minimum CWS for an LAA transmission may be 9 microseconds (μs); however, the size of the CWS and a maximum channel occupancy time (MCOT) (for example, a transmission burst) may be based on governmental regulatory requirements.

The LAA mechanisms are built upon carrier aggregation (CA) technologies of LTE-Advanced systems. In CA, each aggregated carrier is referred to as a component carrier (CC). A CC may have a bandwidth of 1.4, 3, 5, 10, 15 or 20 MHz and a maximum of five CCs can be aggregated, and therefore, a maximum aggregated bandwidth is 100 MHz. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the bandwidths of each CC is usually the same for DL and UL.

CA also comprises individual serving cells to provide individual CCs. The coverage of the serving cells may differ, for example, because CCs on different frequency bands will experience different pathloss. A primary service cell or primary cell (PCell) may provide a primary component carrier (Primary CC, PCC) for both UL and DL, and may handle RRC and NAS related activities. The other serving cells are referred to as secondary cells (SCell), and each SCell may provide an individual secondary component carrier (SCC) for both UL and DL. The SCCs may be added and removed as required, while changing the PCC may require the UE 501, 502 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH carries user data and higher-layer signaling to the UEs 501. The physical downlink control channel (PDCCH) carries information about the transport format and resource allocations related to the PDSCH channel, among other things. It may also inform the UEs 501 about the transport format, resource allocation, and hybrid automatic repeat request (HARQ) information related to the uplink shared channel. Typically, downlink scheduling (assigning control and shared channel resource blocks to the UE 501 *b* within a cell) may be performed at any of the RAN nodes 511 based on channel quality information fed back from any of the UEs 501. The downlink resource assignment information may be sent on the PDCCH used for (e.g., assigned to) each of the UEs 501.

The PDCCH uses control channel elements (CCE) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as REGs. Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an e8ension of the above-described concepts. For example, some embodiments may utilize an enhanced physical downlink control channel (EPDCCH) that uses PDSCH resources for control information transmission. The EPDCCH may be transmitted using one or more enhanced control channel elements (ECCE). Similar to above, each ECCE may correspond to nine sets of four physical resource elements known as an enhanced resource element group (EREG). An ECCE may have other numbers of EREGs in some situations.

The RAN nodes 511 may be configured to communicate with one another via interface 512. In embodiments where the system 500 is an LTE system, the interface 512 may be an X2 interface 512. The X2 interface may be defined between two or more RAN nodes 511 (e.g., two or more eNBs and the like) that connect to EPC 520, and/or between two eNBs connecting to EPC 520. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a master eNB (MeNB) to a secondary eNB (SeNB); information about successful in sequence delivery of PDCP (Packet Data Convergence Protocol, Packet Data Convergence Protocol layer) protocol data units (PDU) to a UE 501 from an SeNB for user data; information of PDCP PDUs that were not delivered to a UE 501; information about a current minimum desired buffer size at the SeNB for transmitting to the UE user data; and the like. The X2-C may provide intra-LTE access mobility functionality, including conte8 transfers from source to target eNBs, user plane transport control, etc.; load management functionality; as well as inter-cell interference coordination functionality.

In embodiments where the system 500 is a 5G or NR system, the interface 512 may be an Xn interface 512. The Xn interface is defined between two or more RAN nodes 511 (e.g., two or more gNBs and the like) that connect to 5GC 520, between a RAN node 511 (e.g., a gNB) connecting to 5GC 520 and an eNB, and/or between two eNBs connecting to 5GC 520. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 501 in a connected mode (e.g., CONNECTION MANAGEMENT (CM)-CONNECTED) including functionality to manage the UE mobility for connected mode between one or more RAN nodes 511. The mobility support may include conte8 transfer from an old (source) serving RAN node 511 to new (target) serving RAN node 511; and control of user plane tunnels between old (source) serving RAN node 511 to new (target) serving RAN node 511. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on stream control transmission protocol (SCTP). The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be same or similar to the user plane and/or control plane protocol stack(s) shown and described herein.

The RAN 510 is shown to be communicatively coupled to a core network—in this embodiment, core network (CN) 520. The CN 520 may comprise a plurality of network elements 522, which are configured to offer various data and telecommunications services to customers/subscribers (e.g., users of UEs 501) who are connected to the CN 520 via the RAN 510. The components of the CN 520 may be implemented in one physical node or separate physical nodes including components to read and execute instructions from a machine-readable or computer-readable medium (e.g., a non-transitory machine-readable storage medium). In some embodiments, network functions virtualization (NFV) may be utilized to virtualize any or all of the above-described network node functions via executable instructions stored in one or more computer-readable storage mediums (described in further detail below). A logical instantiation of the CN 520 may be referred to as a network slice, and a logical instantiation of a portion of the CN 520 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, the application server 530 may be an element offering applications that use IP bearer resources with the core network (e.g., UMTS packet services (PS) domain, LTE PS data services, etc.). The application server 530 can also be configured to support one or more communication services (e.g., Voice-over-Internet Protocol (VOIP) sessions, PTT sessions, group communication sessions, social networking services, etc.) for the UEs 501 via the EPC 520.

In embodiments, the CN 520 may be a 5GC (referred to as "5GC 520" or the like), and the RAN 510 may be connected with the CN 520 via an NG interface 513. In embodiments, the NG interface 513 may be split into two parts, an NG user plane (NG-U) interface 514, which carries traffic data between the RAN nodes 511 and a user plane function (UPF), and the S1 control plane (NG-C) interface 515, which is a signaling Interface between the RAN nodes 511 and AMFs.

In embodiments, the CN 520 may be a 5G CN (referred to as "5GC 520" or the like), while in other embodiments, the CN 520 may be an EPC). Where CN 520 is an EPC (referred to as "EPC 520" or the like), the RAN 510 may be connected with the CN 520 via an S1 interface 513. In embodiments, the S1 interface 513 may be split into two parts, an S1 user plane (S1-U) Interface 514, which carries traffic data between the RAN nodes 511 and the serving gateway (S-GW), and the S1-MME (S1 for the control plane) interface 515, which is a signaling interface between the RAN nodes 511 and mobility management entitys (MME).

Figure 6:
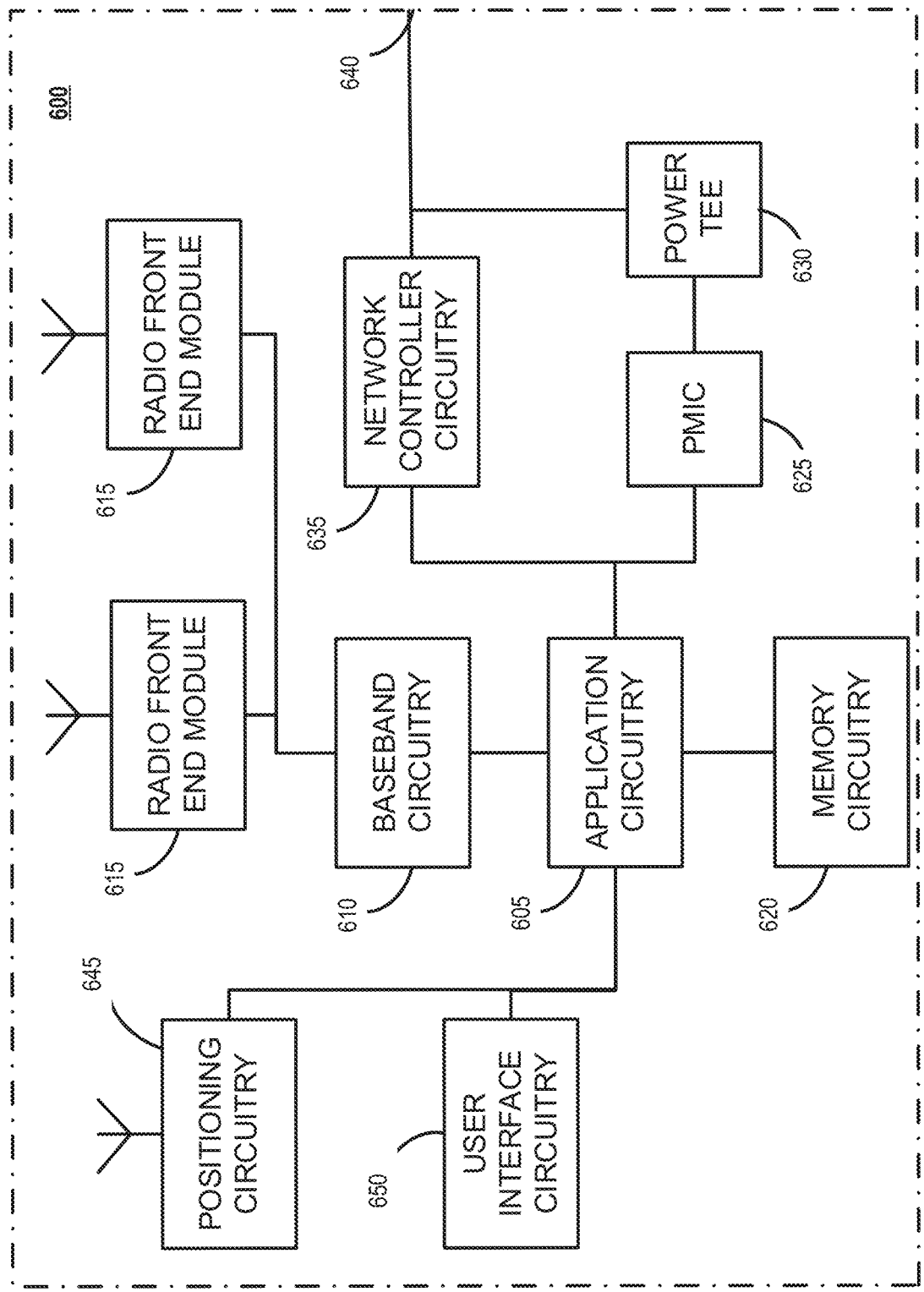
FIG. 6 illustrates an example of infrastructure equipment in accordance with various aspects.

FIG. 6 illustrates an example of infrastructure equipment 600 in accordance with various embodiments. The infrastructure equipment 600 (or "system 600") may be implemented as a base station, radio head, RAN node such as the RAN nodes 511 and/or AP 506 shown and described previously, application server(s) 530, and/or any other element/device discussed herein. In other examples, the system 600 could be implemented in or by a UE.

The system 600 includes application circuitry 605, baseband circuitry 610, one or more radio front end modules (RFEMs) 615, memory circuitry 620, power management integrated circuitry (PMIC) 625, power tee circuitry 630, network controller circuitry 635, network interface connector 640, satellite positioning circuitry 645, and user interface 650. In some embodiments, the device 600 may include additional elements such as, for example, memory/storage, display, camera, sensor, or input/output (I/O) interface. In other embodiments, the components described below may be included in more than one device. For example, said circuitries may be separately included in more than one device for CRAN, vBBU, or other like implementations.

Application circuitry 605 includes circuitry such as, but not limited to one or more processors (or processor cores), cache memory, and one or more of low drop-out voltage regulators (LDOs), interrupt controllers, serial interfaces such as SPI, I²C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 605 may be coupled with or may include memory/storage elements and may be configured to execute instructions stored in the memory/storage to enable various applications or operating systems to run on the system 600. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 605 may include, for example, one or more processor cores (CPUs—Channel-State Information (CSI) processing unit, Central Processing Unit), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some embodiments, the application circuitry 605 may comprise, or may be, a special-purpose processor/controller to operate according to the various embodiments herein. As examples, the processor(s) of application circuitry 605 may include one or more Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings. Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some embodiments, the system 600 may not utilize application circuitry 605, and instead may include a special-purpose processor/controller to process IP data received from an EPC or 5GC, for example.

In some implementations, the application circuitry 605 may include one or more hardware accelerators, which may be microprocessors, programmable processing devices, or the like. The one or more hardware accelerators may include, for example, computer vision (CV) and/or deep learning (DL) accelerators. As examples, the programmable processing devices may be one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such implementations, the circuitry of application circuitry 605 may comprise logic blocks or logic fabric, and other interconnected resources that may be programmed to perform various functions, such as the procedures, methods, functions, etc. of the various embodiments discussed herein. In such embodiments, the circuitry of application circuitry 605 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up-tables (LUTs) and the like.

The baseband circuitry 610 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 610 are discussed infra with regard to FIG. 8.

User interface circuitry 650 may include one or more user interfaces designed to enable user interaction with the system 600 or peripheral component interfaces designed to enable peripheral component interaction with the system 600. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end modules (RFEMs) 615 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays (see e.g., antenna array 811 of FIG. 8 infra), and the RFEM may be connected to multiple antennas. In alternative implementations, both mmWave and sub-mm Wave radio functions may be implemented in the same physical RFEM 615, which incorporates both mm Wave antennas and sub-mm Wave.

The memory circuitry 620 may include one or more of volatile memory including dynamic random access memory (DRAM) and/or synchronous dynamic random access memory (SDRAM), and nonvolatile memory (NVM)

including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. Memory circuitry 620 may be implemented as one or more of solder down packaged Integrated circuits, socketed memory modules and plug-in memory cards.

The PMIC 625 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 630 may provide for electrical power drawn from a network cable to provide both power supply and data connectivity to the infrastructure equipment 600 using a single cable.

The network controller circuitry 635 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 600 via network interface connector 640 using a physical connection, which may be electrical (commonly referred to as a "copper interconnect"), optical, or wireless. The network controller circuitry 635 may include one or more dedicated processors and/or FPGAs to communicate using one or more of the aforementioned protocols. In some implementations, the network controller circuitry 635 may include multiple controllers to provide connectivity to other networks using the same or different protocols.

The positioning circuitry 645 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 645 comprises various hardware elements (e.g., including hardware devices such as switches, filters, amplifiers, antenna elements, and the like to facilitate over-the-air (OTA) communications) to communicate with components of a positioning network, such as navigation satellite constellation nodes. In some embodiments, the positioning circuitry 645 may include a Micro-Technology for Positioning, Navigation, and Timing (Micro-PNT) IC that uses a master timing clock to perform position tracking/estimation without GNSS assistance. The positioning circuitry 645 may also be part of, or interact with, the baseband circuitry 610 and/or RFEMs 615 to communicate with the nodes and components of the positioning network. The positioning circuitry 645 may also provide position data and/or time data to the application circuitry 605, which may use the data to synchronize operations with various infrastructure (e.g., RAN nodes 511, etc.), or the like.

The components shown by FIG. 6 may communicate with one another using Interface circuitry, which may include any number of bus and/or interconnect (IX) technologies such as industry standard architecture (ISA), e8ended ISA (EISA), peripheral component interconnect (PCI), peripheral component interconnect extended (PCIx), PCI express (PCIe), or any number of other technologies. The bus/IX may be a proprietary bus, for example, used in a system on chip (SoC) based system. Other bus/IX systems may be included, such as an I²C interface, an SPI interface, point to point interfaces, and a power bus, among others.

Figure 7:
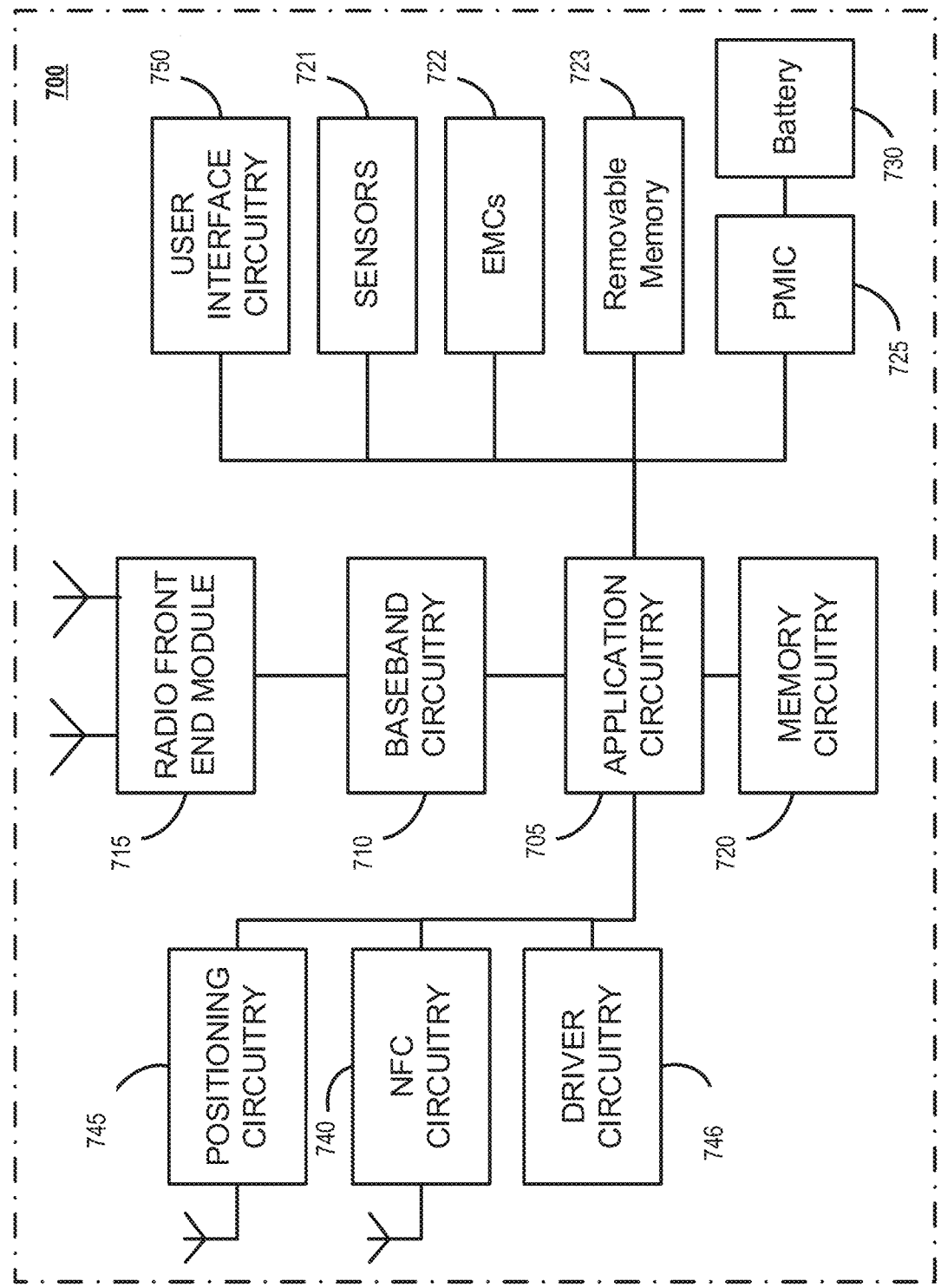
FIG. 7 illustrates an example of a platform (or "device") in accordance with various aspects.

FIG. 7 illustrates an example of a platform 700 (or "device 700") in accordance with various embodiments. In embodiments, the computer platform 700 may be suitable for use as UEs 501, 502, application servers 530, and/or any other element/device discussed herein. The platform 700 may include any combinations of the components shown in the example. The components of platform 700 may be implemented as integrated circuits (ICs), portions thereof, discrete electronic devices, or other modules, logic, hardware, software, firmware, or a combination thereof adapted in the computer platform 700, or as components otherwise incorporated within a chassis of a larger system. The block diagram of FIG. 7 is intended to show a high level view of components of the computer platform 700. However, some of the components shown may be omitted, additional components may be present, and different arrangement of the components shown may occur in other Implementations.

Application circuitry 705 includes circuitry such as, but not limited to one or more processors (or processor cores), cache memory, and one or more of LDOs, interrupt controllers, serial interfaces such as SPI, I²C or universal programmable serial interface module, RTC, timer-counters including interval and watchdog timers, general purpose I/O, memory card controllers such as SD MMC or similar, USB interfaces, MIPI interfaces, and JTAG test access ports. The processors (or cores) of the application circuitry 705 may be coupled with or may include memory/storage elements and may be configured to execute instructions stored in the memory/storage to enable various applications or operating systems to run on the system 700. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 605 may include, for example, one or more processor cores, one or more application processors, one or more GPUs, one or more RISC processors, one or more ARM processors, one or more CISC processors, one or more DSP, one or more FPGAs, one or more PLDs, one or more ASICs, one or more microprocessors or controllers, a multithreaded processor, an ultra-low voltage processor, an embedded processor, some other known processing element, or any suitable combination thereof. In some embodiments, the application circuitry 605 may comprise, or may be, a special-purpose processor/controller to operate according to the various embodiments herein.

As examples, the processor(s) of application circuitry 705 may Include an Intel™ Architecture Core™ based processor, such as a Quark™, an Atom™, an i3, an i5, an i7, or an MCU-class processor, or another such processor available from Intel® Corporation, Santa Clara, CA. The processors of the application circuitry 705 may also be one or more of Advanced Micro Devices (AMD) Ryzen® processor(s) or Accelerated Processing Units (APUs); A5-A9 processor(s) from Apple® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors: or the like. In some implementations, the application circuitry 705 may be a part of a system on a chip (SoC) in which the application circuitry 705 and other components are formed into a single integrated circuit, or a single package, such as the Edison™ or Galileo™ SoC boards from Intel® Corporation.

Additionally or alternatively, application circuitry 705 may include circuitry such as, but not limited to, one or more a field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 705 may comprise logic blocks or logic fabric, and other interconnected resources that may be programmed to perform various functions, such as the procedures, methods, functions, etc. of the various embodiments discussed herein. In such embodiments, the circuitry of application circuitry 705 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks logic fabric, data, etc. in look-up tables (LUTs) and the like.

The baseband circuitry 710 may be implemented, for example, as a solder-down substrate including one or more integrated circuits, a single packaged integrated circuit soldered to a main circuit board or a multi-chip module containing two or more Integrated circuits. The various hardware electronic elements of baseband circuitry 710 are discussed infra with regard to FIG. 8.

The RFEMs 715 may comprise a millimeter wave (mm Wave) RFEM and one or more sub-mm Wave radio frequency integrated circuits (RFICs). In some implementations, the one or more sub-mm Wave RFICs may be physically separated from the mm Wave RFEM. The RFICs may include connections to one or more antennas or antenna arrays (see e.g., antenna array 811 of FIG. 8 infra), and the RFEM may be connected to multiple antennas. In alternative implementations, both mm Wave and sub-mm Wave radio functions may be implemented in the same physical RFEM 715, which incorporates both mm Wave antennas and sub-mmWave.

The memory circuitry 720 may include any number and type of memory devices used to provide for a given amount of system memory. As examples, the memory circuitry 720 may include one or more of volatile memory including random access memory (RAM), dynamic RAM (DRAM) and/or synchronous dynamic RAM (SDRAM), and nonvolatile memory (NVM) including high-speed electrically erasable memory (commonly referred to as Flash memory), phase change random access memory (PRAM), magnetoresistive random access memory (MRAM), etc. The memory circuitry 720 may be developed in accordance with a Joint Electron Devices Engineering Council (JEDEC) low power double data rate (LPDDR)-based design, such as LPDDR2, LPDDR3, LPDDR4, or the like. Memory circuitry 720 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, and/or soldered onto a motherboard via a ball grid array (BGA). In low power implementations, the memory circuitry 720 may be on-die memory or registers associated with the application circuitry 705. To provide for persistent storage of information such as data, applications, operating systems and so forth, memory circuitry 720 may include one or more mass storage devices, which may include, inter alia, a solid state disk drive (SSDD), hard disk drive (HDD), a micro HDD, resistance change memories, phase change memories, holographic memories, or chemical memories, among others. For example, the computer platform 700 may incorporate the three-dimensional (3D) cross-point (XPOINT) memories from Intel® and Micron®.

Removable memory circuitry 723 may include devices, circuitry, enclosures/housings, ports or receptacles, etc. used to couple portable data storage devices with the platform 700. These portable data storage devices may be used for mass storage purposes, and may include, for example, flash memory cards (e.g., Secure Digital (SD) cards, microSD cards, XD picture cards, and the like), and USB flash drives, optical discs, e8ernal HDDs, and the like.

The platform 700 may also include interface circuitry (not shown) that is used to connect external devices with the platform 700. The external devices connected to the platform 700 via the interface circuitry include sensor circuitry 721 and electro-mechanical components (EMCs) 722, as well as removable memory devices coupled to removable memory circuitry 723.

The sensor circuitry 721 include devices, modules, or subsystems whose purpose is to detect events or changes in its environment and send the information (sensor data) about the detected events to some other a device, module, subsystem, etc. Examples of such sensors include, inter alia, inertia measurement units (IMUs) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers: level sensors; flow sensors; temperature sensors (e.g., thermistors); pressure sensors; barometric pressure sensors; gravimeters; altimeters; image capture devices (e.g., cameras or lensless apertures); light detection and ranging (LiDAR) sensors; proximity sensors (e.g., infrared radiation detector and the like), depth sensors, ambient light sensors, ultrasonic transceivers; microphones or other like audio capture devices; etc.

EMCs 722 include devices, modules, or subsystems whose purpose is to enable platform 700 to change its state, position, and/or orientation, or move or control a mechanism or (sub) system. Additionally, EMCs 722 may be configured to generate and send messages/signalling to other components of the platform 700 to indicate a current state of the EMCs 722. Examples of the EMCs 722 include one or more power switches, relays including electromechanical relays (EMRs) and/or solid state relays (SSRs), actuators (e.g., valve actuators, etc.), an audible sound generator, a visual warning device, motors (e.g., direct current (DC) motors, stepper motors, etc.), wheels, thrusters, propellers, claws, clamps, hooks, and/or other like electro-mechanical components. In embodiments, platform 700 is configured to operate one or more EMCs 722 based on one or more captured events and/or instructions or control signals received from a service provider and/or various clients.

In some implementations, the interface circuitry may connect the platform 700 with positioning circuitry 745. The positioning circuitry 745 includes circuitry to receive and decode signals transmitted/broadcasted by a positioning network of a GNSS. Examples of navigation satellite constellations (or GNSS) include United States' GPS, Russia's GLONASS, the European Union's Galileo system, China's BeiDou Navigation Satellite System, a regional navigation system or GNSS augmentation system (e.g., NAVIC), Japan's QZSS, France's DORIS, etc.), or the like. The positioning circuitry 745 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 745 may include a Micro-PNT IC that uses a master timing clock to perform position tracking/estimation without GNSS assistance. The positioning circuitry 745 may also be part of, or interact with, the baseband circuitry 610 and/or RFEMs 715 to communicate with the nodes and components of the positioning network. The positioning circuitry 745 may also provide position data and/or time data to the application circuitry 705, which may use the data to synchronize operations with various infrastructure (e.g., radio base stations), for turn-by-turn navigation applications, or the like In some implementations, the interface circuitry may connect the platform 700 with Near-Field Communication (NFC) circuitry 740. NFC circuitry 740 is configured to provide contactless, short-range communications based on radio frequency identification (RFID) standards, wherein magnetic field induction is used to enable communication between NFC circuitry 740 and NFC-enabled devices external to the platform 700 (e.g., an "NFC touchpoint"). NFC circuitry 740 comprises an NFC controller coupled with an antenna element and a processor coupled with the NFC controller. The NFC controller may be a chip/IC providing NFC functionalities to the NFC circuitry 740 by executing NFC controller firmware and an NFC stack. The NFC stack may be executed by the processor to control the NFC controller, and the NFC controller firmware may be executed by the NFC controller to control the antenna element to emit short-range RF signals. The RF signals may power a passive NFC tag (e.g., a microchip embedded in a sticker or wristband) to transmit stored data to the NFC circuitry 740, or initiate data transfer between the NFC circuitry 740 and another active NFC device (e.g., a smartphone or an NFC-enabled POS terminal) that is proximate to the platform 700.

The driver circuitry 746 may include software and hardware elements that operate to control particular devices that are embedded in the platform 700, attached to the platform 700, or otherwise communicatively coupled with the platform 700. The driver circuitry 746 may include individual drivers allowing other components of the platform 700 to interact with or control various input/output (I/O) devices that may be present within, or connected to, the platform 700. For example, driver circuitry 746 may include a display driver to control and allow access to a display device, a touchscreen driver to control and allow access to a touchscreen interface of the platform 700, sensor drivers to obtain sensor readings of sensor circuitry 721 and control and allow access to sensor circuitry 721. EMC drivers to obtain actuator positions of the EMCs 722 and/or control and allow access to the EMCs 722, a camera driver to control and allow access to an embedded image capture device, audio drivers to control and allow access to one or more audio devices.

The power management integrated circuitry (PMIC) 725 (also referred to as "power management circuitry 725") may manage power provided to various components of the platform 700. In particular, with respect to the baseband circuitry 710, the PMIC 725 may control power-source selection, voltage scaling, battery charging, or DC-to-DC conversion. The PMIC 725 may often be included when the platform 700 is capable of being powered by a battery 730, for example, when the device is included in a UE 501, 502.

In some embodiments, the PMIC 725 may control, or otherwise be part of, various power saving mechanisms of the platform 700. For example, if the platform 700 is in an RRC Connected state, where it is still connected to the RAN node as it expects to receive traffic shortly, then it may enter a state known as Discontinuous Reception Mode (DRX) after a period of inactivity. During this state, the platform 700 may power down for brief intervals of time and thus save power. If there is no data traffic activity for an e8ended period of time, then the platform 700 may transition off to an RRC_Idle state, where it disconnects from the network and does not perform operations such as channel quality feedback, handover, etc.

The platform 700 goes into a very low power state and it performs paging where again it periodically wakes up to listen to the network and then powers down again. The platform 700 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 730 may power the platform 700, although in some examples the platform 700 may be mounted deployed in a fixed location, and may have a power supply coupled to an electrical grid. The battery 730 may be a lithium ion battery, a metal-air battery, such as a zinc-air battery, an aluminum-air battery, a lithium-air battery, and the like. In some implementations, such as in V2X applications, the battery 730 may be a typical lead-acid automotive battery.

In some implementations, the battery 730 may be a "smart battery," which includes or is coupled with a Battery Management System (BMS) or battery monitoring integrated circuitry. The BMS may be included in the platform 700 to track the state of charge (SoCh) of the battery 730. The BMS may be used to monitor other parameters of the battery 730 to provide failure predictions, such as the state of health (SoH) and the state of function (SoF) of the battery 730. The BMS may communicate the information of the battery 730 to the application circuitry 705 or other components of the platform 700. The BMS may also include an analog-to-digital (ADC) convertor that allows the application circuitry 705 to directly monitor the voltage of the battery 730 or the current flow from the battery 730. The battery parameters may be used to determine actions that the platform 700 may perform, such as transmission frequency, network operation, sensing frequency, and the like.

A power block, or other power supply coupled to an electrical grid may be coupled with the BMS to charge the battery 730. In some examples, the power block XS30 may be replaced with a wireless power receiver to obtain the power wirelessly, for example, through a loop antenna in the computer platform 700. In these examples, a wireless battery charging circuit may be included in the BMS. The specific charging circuits chosen may depend on the size of the battery 730, and thus, the current required. The charging may be performed using the Airfuel standard promulgated by the Airfuel Alliance, the Qi wireless charging standard promulgated by the Wireless Power Consortium, or the Rezence charging standard promulgated by the Alliance for Wireless Power, among others.

User interface circuitry 750 includes various input/output (I/O) devices present within, or connected to, the platform 700, and includes one or more user interfaces designed to enable user interaction with the platform 700 and/or peripheral component interfaces designed to enable peripheral component interaction with the platform 700. The user interface circuitry 750 includes input device circuitry and output device circuitry. Input device circuitry includes any physical or virtual means for accepting an input including, inter alia, one or more physical or virtual buttons (e.g., a reset button), a physical keyboard, keypad, mouse, touchpad, touchscreen, microphones, scanner, headset, and/or the like. The output device circuitry includes any physical or virtual means for showing information or otherwise conveying information, such as sensor readings, actuator position (s), or other like information. Output device circuitry may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 700. The output device circuitry may also include speakers or other audio emitting devices, printer(s), and/or the like. In some embodiments, the sensor circuitry 721 may be used as the input device circuitry (e.g., an image capture device, motion capture device, or the like) and one or more EMCs may be used as the output device circuitry (e.g., an actuator to provide haptic feedback or the like). In another example, NFC circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc.

Although not shown, the components of platform 700 may communicate with one another using a suitable bus or interconnect (IX) technology, which may include any number of technologies, including ISA, EISA, PCI, PCIx, PCIe, a Time-Trigger Protocol (TTP) system, a FlexRay system, or any number of other technologies. The bus/IX may be a proprietary bus/IX, for example, used in a SoC based system. Other bus/IX systems may be included, such as an FC interface, an SPI interface, point-to-point interfaces, and a power bus, among others.

Figure 8:
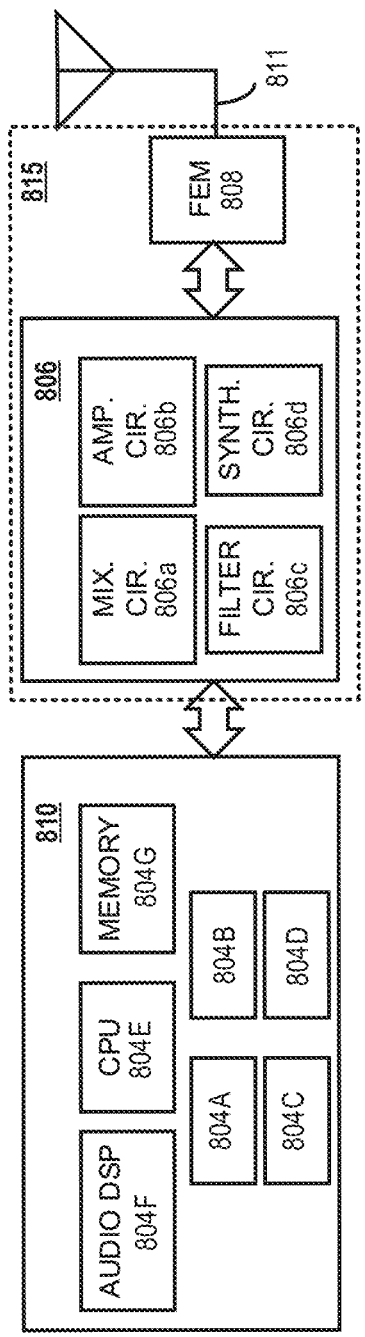
FIG. 8 illustrates example components of baseband circuitry and radio front end modules (RFEM) in accordance with various aspects.

FIG. 8 illustrates example components of baseband circuitry 810 and radio front end modules (RFEM) 815 in accordance with various embodiments. The baseband circuitry 810 corresponds to the baseband circuitry 610 and 710 of FIGS. 6 and 7, respectively. The RFEM 815 corresponds to the RFEM 615 and 715 of FIGS. 6 and 7, respectively. As shown, the RFEMs 815 may include Radio Frequency (RF) circuitry 806, front-end module (FEM) circuitry 808, antenna array 811 coupled together at least as shown.

The baseband circuitry 810 includes circuitry and/or control logic configured to carry out various radio/network protocol and radio control functions that enable communication with one or more radio networks via the RF circuitry 806. The radio control functions may include, but are not limited to, signal modulation/demodulation, encoding/decoding, radio frequency shifting, etc. In some embodiments, modulation/demodulation circuitry of the baseband circuitry 810 may include Fast-Fourier Transform (FFT), precoding, or constellation mapping/demapping functionality. In some embodiments, encoding/decoding circuitry of the baseband circuitry 810 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments. The baseband circuitry 810 is configured to process baseband signals received from a receive signal path of the RF circuitry 806 and to generate baseband signals for a transmit signal path of the RF circuitry 806. The baseband circuitry 810 is configured to interface with application circuitry 605/705 (see FIGS. 6 and 7) for generation and processing of the baseband signals and for controlling operations of the RF circuitry 806. The baseband circuitry 810 may handle various radio control functions.

The aforementioned circuitry and/or control logic of the baseband circuitry 810 may include one or more single or multi-core processors. For example, the one or more processors may include a 3G baseband processor 804A, a 4G/LTE baseband processor 804B, a 5G/NR baseband processor 804C, or some other baseband processor(s) 804D for other existing generations, generations in development or to be developed in the future (e.g., si8h generation (6G), etc.). In other embodiments, some or all of the functionality of baseband processors 804A-D may be included in modules stored in the memory 804G and executed via a Central Processing Unit (CPU) 804E. In other embodiments, some or all of the functionality of baseband processors 804A-D may be provided as hardware accelerators (e.g., field-programmable gate arrays (FPGA). ASICs, etc.) loaded with the appropriate bit streams or logic blocks stored in respective memory cells. In various embodiments, the memory 804G may store program code of a real-time OS (RTOS), which when executed by the CPU 804E (or other baseband processor), is to cause the CPU 804E (or other baseband processor) to manage resources of the baseband circuitry 810, schedule tasks, etc. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein. In addition, the baseband circuitry 810 includes one or more audio digital signal processor(s) (DSP) 804F. The audio DSP(s) 804F include elements for compression/decompression and echo cancellation and may include other suitable processing elements in other embodiments.

In some embodiments, each of the processors 804A-8104E include respective memory interfaces to send/receive data to/from the memory 804G. The baseband circuitry 810 may further include one or more interfaces to communicatively couple to other circuitries/devices, such as an interface to send/receive data to/from memory e8ernal to the baseband circuitry 810; an application circuitry interface to send/receive data to/from the application circuitry 605/705 of FIGS. 6-8); an RF circuitry interface to send/receive data to/from RF circuitry 806 of FIG. 8; a wireless hardware connectivity interface to send/receive data to/from one or more wireless hardware elements (e.g., Near Field Communication (NFC) components, Bluetooth®/Bluetooth® Low Energy components, Wi-Fi® components, and/or the like); and a power management interface to send/receive power or control signals to/from the PMIC 725.

In alternate embodiments (which may be combined with the above described embodiments), baseband circuitry 810 comprises one or more digital baseband systems, which are coupled with one another via an interconnect subsystem and to a CPU subsystem, an audio subsystem, and an interface subsystem. The digital baseband subsystems may also be coupled to a digital baseband interface and a mixed-signal baseband subsystem via another interconnect subsystem. Each of the interconnect subsystems may include a bus system, point-to-point connections, network-on-chip (NOC) structures, and/or some other suitable bus or interconnect technology, such as those discussed herein. The audio subsystem may include DSP circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 810 may include protocol processing circuitry with one or more instances of control circuitry (not shown) to provide control functions for the digital baseband circuitry and/or radio frequency circuitry (e.g., the radio front end modules 815).

Although not shown by FIG. 8, in some embodiments, the baseband circuitry 810 includes individual processing device(s) to operate one or more wireless communication protocols (e.g., a "multi-protocol baseband processor" or "protocol processing circuitry") and individual processing device(s) to implement PHY layer functions. In these embodiments, the PHY layer functions include the aforementioned radio control functions. In these embodiments, the protocol processing circuitry operates or implements various protocol layers/entities of one or more wireless communication protocols. In a first example, the protocol processing circuitry may operate LTE protocol entities and/or 5G/NR protocol entities when the baseband circuitry 810 and/or RF circuitry 806 are part of mm Wave communication circuitry or some other suitable cellular communication circuitry. In the first example, the protocol processing circuitry would operate MAC, RLC, PDCP (Packet Data Convergence Protocol, Packet Data Convergence Protocol layer), service data adaptation protocol layer (SDAP), RRC, and NAS functions. In a second example, the protocol processing circuitry may operate one or more Institute of Electrical and Electronics Engineers (IEEE)-based protocols when the baseband circuitry 810 and/or RF circuitry 806 are part of a Wi-Fi communication system. In the second example, the protocol processing circuitry would operate Wi-Fi MAC and logical link control (LLC) functions. The protocol processing circuitry may include one or more memory structures (e.g., 804G) to store program code and data for operating the protocol functions, as well as one or more processing cores to execute the program code and perform various operations using the data. The baseband circuitry 810 may also support radio communications for more than one wireless protocol.

The various hardware elements of the baseband circuitry 810 discussed herein may be implemented, for example, as a solder-down substrate including one or more integrated circuits (ICs), a single packaged IC soldered to a main circuit board or a multi-chip module containing two or more ICs. In one example, the components of the baseband circuitry 810 may be suitably combined in a single chip or chipset, or disposed on a same circuit board. In another example, some or all of the constituent components of the baseband circuitry 810 and RF circuitry 806 may be implemented together such as, for example, a system on a chip (SoC) or System-in-Package (SiP). In another example, some or all of the constituent components of the baseband circuitry 810 may be implemented as a separate SoC that is communicatively coupled with and RF circuitry 806 (or multiple instances of RF circuitry 806). In yet another example, some or all of the constituent components of the baseband circuitry 810 and the application circuitry 605/705 may be implemented together as individual SoCs mounted to a same circuit board (e.g., a "multi-chip package").

In some embodiments, the baseband circuitry 810 may provide for communication compatible with one or more radio technologies. For example, in some embodiments, the baseband circuitry 810 may support communication with an E-UTRAN or other WMAN (wireless metropolitan area network), a WLAN, a WPAN (wireless personal area network). Embodiments in which the baseband circuitry 810 is configured to support radio communications of more than one wireless protocol may be referred to as multi-mode baseband circuitry.

RF circuitry 806 may enable communication with wireless networks using modulated electromagnetic radiation through a non-solid medium. In various embodiments, the RF circuitry 806 may include switches, filters, amplifiers, etc. to facilitate the communication with the wireless network. RF circuitry 806 may include a receive signal path, which may include circuitry to down-convert RF signals received from the FEM circuitry 808 and provide baseband signals to the baseband circuitry 810. RF circuitry 806 may also include a transmit signal path, which may include circuitry to up-convert baseband signals provided by the baseband circuitry 810 and provide RF output signals to the FEM circuitry 808 for transmission.

In some embodiments, the receive signal path of the RF circuitry 806 may include mixer circuitry 806 *a*, amplifier circuitry 806 *b* and filter circuitry 806 *c*. In some embodiments, the transmit signal path of the RF circuitry 806 may include filter circuitry 806 *c* and mixer circuitry 806 *a*. RF circuitry 806 may also include synthesizer circuitry 806 *d* for synthesizing a frequency for use by the mixer circuitry 806 *a* of the receive signal path and the transmit signal path. In some embodiments, the mixer circuitry 806 *a* of the receive signal path may be configured to down-convert RF signals received from the FEM circuitry 808 based on the synthesized frequency provided by synthesizer circuitry 806 *d*. The amplifier circuitry 806 *b* may be configured to amplify the down-converted signals and the filter circuitry 806 *c* may be a low-pass filter (LPF) or band-pass filter (BPF) configured to remove unwanted signals from the down-converted signals to generate output baseband signals. Output baseband signals may be provided to the baseband circuitry 810 for further processing. In some embodiments, the output baseband signals may be zero-frequency baseband signals, although this is not a requirement. In some embodiments, mixer circuitry 806 *a* of the receive signal path may comprise passive mixers, although the scope of the embodiments is not limited in this respect.

In some embodiments, the mixer circuitry 806 *a* of the transmit signal path may be configured to up-convert input baseband signals based on the synthesized frequency provided by the synthesizer circuitry 806 *d* to generate RF output signals for the FEM circuitry 808. The baseband signals may be provided by the baseband circuitry 810 and may be filtered by filter circuitry 806 *c*.

In some embodiments, the mixer circuitry 806 *a* of the receive signal path and the mixer circuitry 806 *a* of the transmit signal path may include two or more mixers and may be arranged for quadrature downconversion and upconversion, respectively. In some embodiments, the mixer circuitry 806 *a* of the receive signal path and the mixer circuitry 806 *a* of the transmit signal path may include two or more mixers and may be arranged for image rejection (e.g., Hartley image rejection). In some embodiments, the mixer circuitry 806 *a* of the receive signal path and the mixer circuitry 806 *a* of the transmit signal path may be arranged for direct downconversion and direct upconversion, respectively. In some embodiments, the mixer circuitry 806 *a* of the receive signal path and the mixer circuitry 806 *a* of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 806 may include analog-to-digital converter (ADC) and digital-to-analog converter (DAC) circuitry and the baseband circuitry 810 may include a digital baseband interface to communicate with the RF circuitry 806.

In some dual-mode embodiments, a separate radio IC circuitry may be provided for processing signals for each spectrum, although the scope of the embodiments is not limited in this respect.

In some embodiments, the synthesizer circuitry 806 *d* may be a fractional-N synthesizer or a fractional N/N+1 synthesizer, although the scope of the embodiments is not limited in this respect as other types of frequency synthesizers may be suitable. For example, synthesizer circuitry 806 *d* may be a delta-sigma synthesizer, a frequency multiplier, or a synthesizer comprising a phase-locked loop with a frequency divider.

The synthesizer circuitry 806 *d* may be configured to synthesize an output frequency for use by the mixer circuitry 806 *a* of the RF circuitry 806 based on a frequency input and a divider control input. In some embodiments, the synthesizer circuitry 806 *d* may be a fractional N/N+1 synthesizer.

In some embodiments, frequency input may be provided by a voltage controlled oscillator (VCO), although that is not a requirement. Divider control input may be provided by either the baseband circuitry 810 or the application circuitry 605/705 depending on the desired output frequency. In some embodiments, a divider control input (e.g., N) may be determined from a look-up table based on a channel indicated by the application circuitry 605/705.

Synthesizer circuitry 806 *d* of the RF circuitry 806 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 806 *d* may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (110). In some embodiments, the RF circuitry 806 may include an IQ/polar converter.

FEM circuitry 808 may include a receive signal path, which may include circuitry configured to operate on RF signals received from antenna array 811, amplify the received signals and provide the amplified versions of the received signals to the RF circuitry 806 for further processing. FEM circuitry 808 may also include a transmit signal path, which may include circuitry configured to amplify signals for transmission provided by the RF circuitry 806 for transmission by one or more of antenna elements of antenna array 811. In various embodiments, the amplification through the transmit or receive signal paths may be done solely in the RF circuitry 806, solely in the FEM circuitry 808, or in both the RF circuitry 806 and the FEM circuitry 808.

In some embodiments, the FEM circuitry 808 may include a TX/RX switch to switch between transmit mode and receive mode operation. The FEM circuitry 808 may include a receive signal path and a transmit signal path. The receive signal path of the FEM circuitry 808 may include an LNA to amplify received RF signals and provide the amplified received RF signals as an output (e.g., to the RF circuitry 806). The transmit signal path of the FEM circuitry 808 may include a power amplifier (PA) to amplify input RF signals (e.g., provided by RF circuitry 806), and one or more filters to generate RF signals for subsequent transmission by one or more antenna elements of the antenna array 811.

The antenna array 811 comprises one or more antenna elements, each of which is configured convert electrical signals into radio waves to travel through the air and to convert received radio waves into electrical signals. For example, digital baseband signals provided by the baseband circuitry 810 is converted into analog RF signals (e.g., modulated waveform) that will be amplified and transmitted via the antenna elements of the antenna array 811 including one or more antenna elements (not shown). The antenna elements may be omnidirectional, direction, or a combination thereof. The antenna elements may be formed in a multitude of arranges as are known and/or discussed herein. The antenna array 811 may comprise microstrip antennas or printed antennas that are fabricated on the surface of one or more printed circuit boards. The antenna array 811 may be formed in as a patch of metal foil (e.g., a patch antenna) in a variety of shapes, and may be coupled with the RF circuitry 806 and/or FEM circuitry 808 using metal transmission lines or the like.

Processors of the application circuitry 605/705 and processors of the baseband circuitry 810 may be used to execute elements of one or more instances of a protocol stack. For example, processors of the baseband circuitry 810, alone or in combination, may be used execute Layer 3, Layer 2, or Layer 1 functionality, while processors of the application circuitry 605/705 may utilize data (e.g., packet data) received from these layers and further execute Layer 4 functionality (e.g., transmission communication protocol (TCP) and UDP layers). As referred to herein, Layer 3 may comprise a RRC layer, described in further detail below. As referred to herein, Layer 2 may comprise a MAC layer, an RLC layer, and a PDCP layer, described in further detail below. As referred to herein, Layer 1 may comprise a PHY layer of a UE/RAN node, described in further detail below.

Figure 9:
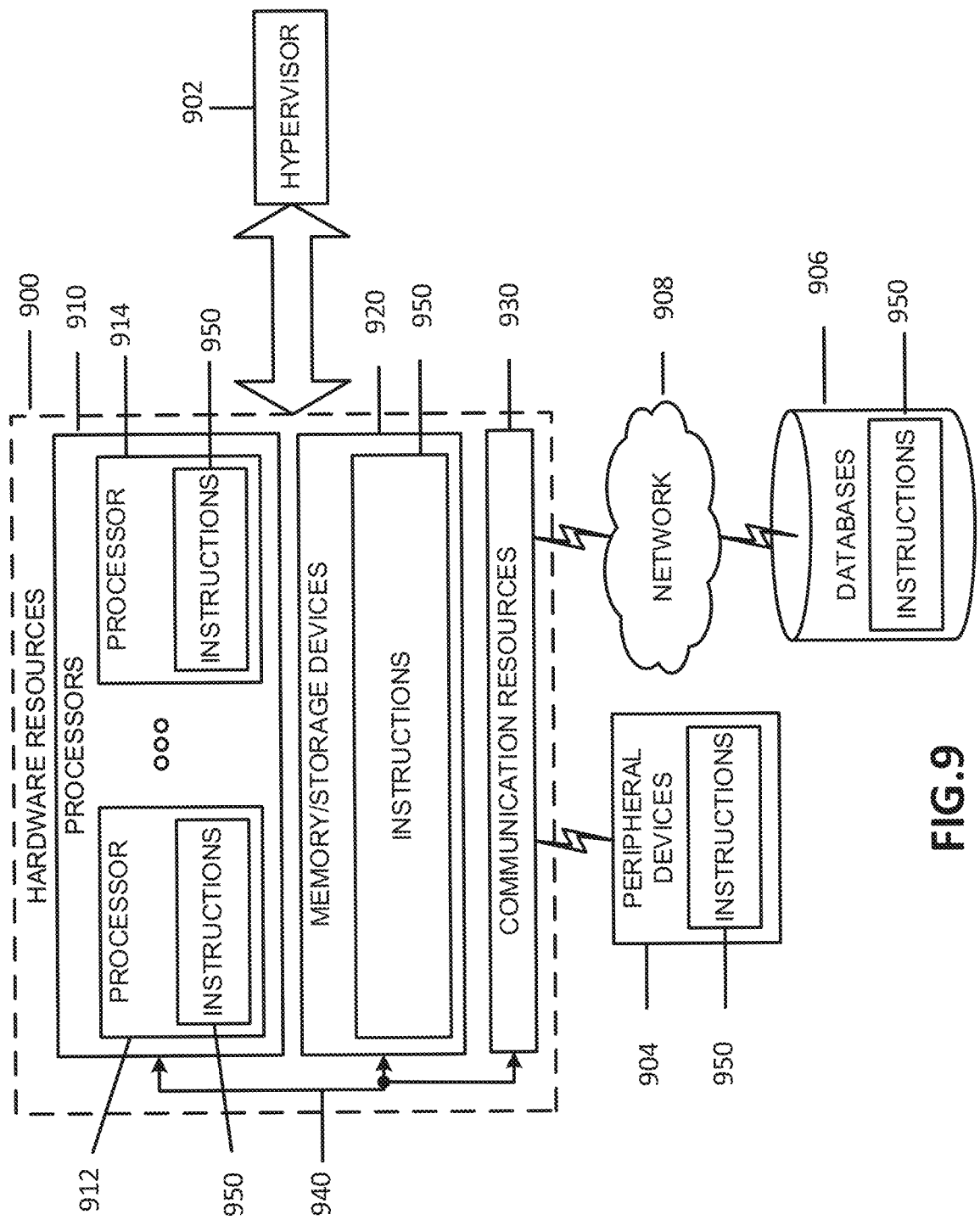
FIG. 9 illustrates a block diagram illustrating components, according to some example aspects, able to read instructions from a machine-readable or computer-readable medium (e.g., a non-transitory machine-readable storage medium) and perform any one or more of the methodologies discussed herein.

FIG. 9 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 9 shows a diagrammatic representation of hardware resources 900 including one or more processors (or processor cores) 910, one or more memory/storage devices 920, and one or more communication resources 930, each of which may be communicatively coupled via a bus 940. For embodiments where node virtualization (e.g., NFV) is utilized, a hypervisor 902 may be executed to provide an execution environment for one or more network slices/sub-slices to utilize the hardware resources 900.

The processors 910 may include, for example, a processor 912 and a processor 914. The processor(s) 910 may be, for example, a central processing unit (CPU), a reduced instruction set computing (RISC) processor, a complex Instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 920 may include main memory, disk storage, or any suitable combination thereof. The memory/storage devices 920 may include, but are not limited to, any type of volatile or nonvolatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 930 may include interconnection or network interface components or other suitable devices to communicate with one or more peripheral devices 904 or one or more databases 906 via a network 908. For example, the communication resources 930 may include wired communication components (e.g., for coupling via USB), cellular communication components, NFC components, Bluetooth® (or Bluetooth® Low Energy) components, Wi-Fi® components, and other communication components.

Instructions 950 may comprise software, a program, an application, an applet, an app, or other executable code for causing at least any of the processors 910 to perform any one or more of the methodologies discussed herein. The instructions 950 may reside, completely or partially, within at least one of the processors 910 (e.g., within the processor's cache memory), the memory/storage devices 920, or any suitable combination thereof. Furthermore, any portion of the instructions 950 may be transferred to the hardware resources 900 from any combination of the peripheral devices 904 or the databases 906. Accordingly, the memory of processors 910, the memory/storage devices 920, the peripheral devices 904, and the databases 906 are examples of computer-readable and machine-readable media.

Example Procedures

In some aspects, the electronic device(s), network(s), system(s), chip(s) or component(s), or portions or implementations thereof, of FIGS. 1-9, or some other FIG. herein, may be configured to perform one or more processes, techniques, or methods as described herein, or portions thereof. One such process may be depicted in FIG. 10. For example, the process may include configuring or causing to configure DL and uplink (UL) receive sources of a first IAB node; sharing or causing to share a radio frequency (RF) receiver by a DL receive branch of the IAB node and a UL receive branch of the first IAB node; and determining or causing to determine a DL timing adjustment (TA) value for a second IAB node that may be a child IAB node of the first IAB node, wherein the determination may be based on one or more of: a UL TA value of the second IAB node, and a timing offset.

In some aspects, the electronic device(s), network(s), system(s), chip(s) or component(s), or portions or implementations thereof, of FIGS. 1-14, or some other FIG. herein, may be configured to perform one or more processes, techniques, or methods as described herein, or portions thereof. One such process may be depicted in FIG. 11. For example, the process may include configuring or causing to configure DL and uplink (UL) receive sources of a first IAB node; sharing or causing to share a radio frequency (RF) receiver by a DL receive branch of the IAB node and a UL receive branch of the first IAB node; and determining or causing to determine a DL timing adjustment (TA) value for a second IAB node that may be a child IAB node of the first IAB node as a timing adjustment group (TAG), wherein the TAG may be not based on or associated with a UL TA value of the second IAB node.

For one or more aspects, at least one of the components set forth in one or more of the preceding FIGS. may be configured to perform one or more operations, techniques, processes, and/or methods as set forth in the example section below. For example, the baseband circuitry as described above in connection with one or more of the preceding FIGS. may be configured to operate in accordance with one or more of the examples set forth below. For another example, circuitry associated with a UE, base station, network element, etc. as described above in connection with one or more of the preceding FIGS. may be configured to operate in accordance with one or more of the examples set forth below in the example section.

Examples

The examples set forth herein are illustrative and not exhaustive.

Example 1 is a radio access node, including one or more processors configured to determine a first reference timing of a first communication connection between the radio access node and a second, parent radio access node. The one or more processors may further be configured to determine a second reference timing of a second communication connection between the radio access node and a third, child radio access node. The radio access node may further include a memory storing the first and second reference timings. The one or more processors are further configured to generate a request for the child radio access node to perform a timing advance adjustment based on the stored first and second reference timings, so that an uplink receive signal transmitted by the child radio access node arrives at the same time at the radio access node as a downlink receive signal transmitted by the parent radio access node arrives at the radio access node in case of frequency division multiplexed signals.

Example 2 is a radio access node according to example 1, wherein the radio access node is integrated in a 5G communication network and the signals are signals of the 5G communication network.

Example 3 is a radio access node according to anyone of examples 1 or 2, wherein the radio access node includes at least one receiver configured to receive signals transmitted by the parent radio access node and the child radio access node.

Example 4 is a radio access node according to anyone of examples 1 to 3, wherein the radio access node includes at least one transmitter configured to transmit the request.

Example 5 is a radio access node according to anyone of examples 1 to 4, wherein the radio access node is a base station or a core network component.

Example 6 is a radio access node according to anyone of examples 1 to 5, wherein the radio access node is an integrated access and backhaul node (IAB). The integrated access and backhaul node may also be denoted as relay node.

Example 7 is a radio access node according to any one of examples 1 to 6, wherein the child radio access node(s) is an integrated access and backhaul node.

Example 8 is a radio access node according to anyone of examples 1 to 7, wherein the downlink connection and the uplink connection of the radio access node share the same receiver.

Example 9 is a radio access node according to anyone of examples 1 to 8, further including a plurality of receivers for communicating with parent radio access node and the child radio access node.

Example 10 is a radio access node according to any one of examples 1 to 9, wherein the radio access node is configured to apply different analog spatial beamformers for the receive signals transmitted by the parent radio access node and the child radio access node.

Example 11 is a radio access node according to any one of examples 1 to 10, wherein the radio access node and the child (c) radio access node (see FIG. 2) are configured such that the radio access node and the child radio access node both use the same RF receiver for FDMed DL and UL reception. For the radio access node, the UL Tx timing advance $T_{A,UL}^1$ for the radio access node signaled by the parent radio access node can be calculated using Eq. (1).

Example 12 is a radio access node according to anyone of examples 1 to 11, wherein the radio access node is configured to transmit a DL signal around the same time to (FIG. 2) as the parent radio access node. The radio access node is configured to determine its DL transmit (tx) timing $T_{A,DL}^1$ with respect to its reference timing $t_1$ using Eq. (2).

Example 13 is a radio access node according to anyone of examples 1 to 12, wherein, when FDMed receive (rx) signals transmitted by both the parent radio access node and the child radio access node in DL and UL respectively, are received simultaneously, the radio access node is configured to mitigate the unorthogonality caused by the misaligned arrival timing which can exceed the cyclic prefix, and further that the radio access node is configured to command the child radio access node to perform a timing advance adjustment so that the UL rx signal transmitted by the child radio access node can arrive at approximately the same time as in DL rx signal transmitted by the parent radio access node.

Example 14 is a radio access node according to any one of examples 1 to 13, wherein the radio access node is configured such that the reference timing of child radio access node, defined as $t_2$, is determined by the arrival time of DL rx signal of the child radio access node which is transmitted by the radio access node, as such the time advance value $T_{A,UL}^2$ with respect to $t_2$ signaled transmitted by the radio access node can be calculated using Eq. (3).

Example 15 is a radio access node according to anyone of examples 1 to 14, wherein the radio access node is configured to achieve synchronous DL transmission, the DL Tx timing $T_{A,DL}^2$ of child radio access node with respect to $t_2$, can be calculated using Eq. (4).

Example 16 is a radio access node according to anyone of examples 1 to 15, wherein the timing advance adjustment $T_{A,DL}^2$ for the child radio access node DL transmission depends both TA value $T_{A,UL}^2$ for UL transmission as well as another parameter $T_{(d,1)}$, which is the timing difference between DL Tx and UL Rx of radio access node.

Example 17 is a radio access node, including one or more processors configured to determine a first reference timing of a first communication connection between the radio access node and a second, parent radio access node. The one or more processors may further be configured to determine a second reference timing of a second communication connection between the radio access node and a third, child radio access node. The radio access node may further include a memory storing the first and second reference timings. The one or more processors may further be configured to generate a request for the child radio access node to perform a timing advance adjustment based on the stored first and second reference timings, so that an uplink receive signal transmitted by the child radio access node arrives at the same time at the radio access node as a downlink transmission signal transmitted by the radio access node arrives at the child radio access node in case of frequency division multiplexed signals.

Example 18 is a radio access node according to example 17, wherein the radio access node is integrated in a 5G communication network and the signals are signals of the 5G communication network.

Example 19 is a radio access node according to anyone of examples 17 or 18, wherein the radio access node includes at least one receiver configured to receive signals transmitted by the parent radio access node and the child radio access node.

Example 20 is a radio access node according to anyone of examples 17 to 19, wherein the radio access node includes at least one transmitter configured to transmit the request.

Example 21 is a radio access node according to anyone of examples 17 to 20, wherein the radio access node is a base station or a core network component Example 22 is a radio access node according to anyone of examples 17 to 21, wherein the radio access node is an integrated access and backhaul node (IAB). The integrated access and backhaul node may also be denoted as relay node.

Example 23 is a radio access node according to anyone of examples 17 to 22, wherein the child radio access node(s) is an integrated access and backhaul node.

Example 24 is a radio access node according to anyone of examples 17 to 23, wherein the downlink connection and the uplink connection of the radio access node share the same receiver.

Example 25 is a radio access node according to anyone of examples 17 to 24, further including a plurality of receivers for communicating with parent radio access node and the child radio access node.

Example 26 is a radio access node according to any one of examples 17 to 25, wherein the radio access node is configured to apply different analog spatial beamformers for the receive signals transmitted by the parent radio access node and the child radio access node.

Example 27 is a radio access node according to anyone of examples 17 to 26, wherein the radio access node and the child radio access node (see FIG. 3) use the same RF receiver for time division multiplexing (TDM) DL and UL reception. The DL and UL transmission time for radio access node can be calculated using Eqs (1) and (2), respectively.

Example 28 is a radio access node according to anyone of examples 17 to 27, wherein the TDMed rx signals transmitted by both parent radio access node and child radio access node in DL and UL respectively, are received at different times, the radio access node is configured to command the child radio access node to perform a timing advance adjustment so that the UL rx signal transmitted by the child radio access node can arrive at approximately same time as in DL Tx signal of the radio access node (see FIG. 3).

Example 29 is a radio access node according to any one of examples 17 to 28, wherein the reference timing of child radio access node, defined as $t_2$, is determined by the arrival time of DL rx signal of child radio access node which is transmitted by the radio access node, as such the time advance value with respect to $t_2$ signaled transmitted by radio access node can be calculated as Eq. (5).

Example 30 is a radio access node according to anyone of examples 17 to 29, wherein the radio access node is configured to achieve synchronous DL transmission, wherein the DL Tx timing of child radio access node, with respect to $t_2$, can be calculated using Eq. (6).

Example 31 is a radio access node according to any one of examples 17 to 30, wherein the timing advance adjustment $T_{A,DL}^2$ for the child radio access node DL transmission depends on only TA value $T_{A,UL}^2$ for UL transmission similar to radio access node $T_{A,DL}^1$ with respect to $T_{A,UL}^1$.

Example 32 is a radio access node according to example 31, wherein the $T_{A,DL}^3$ determination is also calculated in case the radio access node is equipped with multiple RF frontends and applies different analog spatial beamformers for the receive signals transmitted by the parent radio access node and child radio access node. This way, the baseband receive signals of the parent radio access node and the child radio access node may not interfere each other.

Example 33 is a radio access node, including one or more processors configured to determine a first reference timing of a first communication connection between the radio access node and a second, parent radio access node. The one or more processors are further configured to determine a second reference timing of a second communication connection between the radio access node and a third, child radio access node. The one or more processors are further configured to determine a third reference timing of a third communication connection between the radio access node and a fourth, child radio access node. The radio access node further includes a memory storing the first, second and third reference timings. The one or more processors are further configured to generate a request for the third, child radio access node to perform a timing advance adjustment based on the stored first and second reference timings, so that an uplink receive signal transmitted by the third, child radio access node arrives at the same time at the radio access node as a downlink transmission signal transmitted by the radio access node arrives at the third, child radio access node in case of frequency division multiplexed signals; and to generate a request for the fourth, child radio access node to perform a timing advance adjustment based on the stored first and third reference timings, so that an uplink receive signal transmitted by the fourth, child radio access node arrives at the same time at the radio access node as a downlink transmission signal transmitted by the radio access node arrives at the fourth, child radio access node in case of frequency division multiplexed signals.

Example 34 is a radio access node according to example 33, wherein the radio access node is integrated in a 5G communication network and the signals are signals of the 5G communication network.

Example 35 is a radio access node according to anyone of examples 33 or 34, wherein the radio access node includes at least one receiver configured to receive signals transmitted by the parent radio access node and the child radio access node.

Example 36 is a radio access node according to anyone of examples 33 to 35, wherein the radio access node includes at least one transmitter configured to transmit the request.

Example 37 is a radio access node according to any one of examples 33 to 36, wherein the radio access node is a base station or a core network component.

Example 38 is a radio access node according to any one of examples 33 to 37, wherein the radio access node is an integrated access and backhaul node (IAB). The integrated access and backhaul node may also be denoted as relay node.

Example 39 is a radio access node according to any one of examples 33 to 38, wherein the child radio access node(s) is an integrated access and backhaul node.

Example 40 is a radio access node according to any one of examples 33 to 39, wherein a downlink connection and a uplink connection of the radio access node share the same receiver.

Example 41 is a radio access node according to any one of examples 33 to 40, further including a plurality of receivers for communicating with the parent radio access node and the child radio access node.

Example 42 is a radio access node according to any one of examples 33 to 41, wherein the radio access node is configured to apply different analog spatial beamformers for the receive signals transmitted by the parent radio access node and the child radio access node.

Example 43 is a radio access node according to any one of examples 33 to 42, wherein the radio access node communicates with at least two child radio access nodes, wherein the TA value of the third, child radio access node DL tx can be calculated according to Eq. (4) while the TA value of the fourth, child radio access node Tx can be calculated by Eq. (6). As a result, the TA value for the third, child radio access node can be configured by using UE-specific signaling.

Example 44 is a radio access node according to any one of examples 33 to 43, wherein the DL tx timing $T_{A,DL}^2$ originated from the third, child radio access node can be configured to be associated with the UL transmission timing $T_{A,UL}^2$ of the third, child radio access node according to Eq. (6).

Example 45 is a radio access node according to any one of examples 33 to 44, wherein the DL tx timing $T_{A,DL}^2$ originated from the child radio access node can be configured to be associated with the UL transmission timing $T_{A,UL}^2$ of the child radio access node as well as an additional signaled timing offset value $T_{(d,1)}$ according to Eq. (4).

Example 46 is a radio access node according to any one of examples 33 to 45, wherein the DL tx timing $T_{A,DL}^2$ originated from the third, child radio access node can be configured with a standalone TA value without assuming connection with the respective UL TA.

Example 47 is a radio access node according to any one of examples 33 to 38, wherein the DL cell originated from child radio access node is signaled as a different TA group (TAG) than the respective UL transmission of the child radio access node. As a result, the child radio access node can adjust the DL and UL transmission timing separately.

Example 48 is a method of downlink (DL) transmission timing for an radio access node, e.g. an integrated access and backhaul (IAB) node in a fifth generation (5G) or new radio (NR) network. The method including: configuring or causing to configure downlink (DL) and uplink (UL) receive sources of the radio access node and for child, third radio access node, e.g. sharing or causing to share a radio frequency (RF) receiver by the radio access node and the child radio access node; determining or causing to determine a DL timing adjustment (TA) value for the child radio access node based on one or more selected from a group consisting of: an UL timing adjustment (TA) value of the child radio access node, and a timing offset; and receiving or causing to receive one selected from a group consisting of: a UL receive (Rx) transmitted by the child radio access node at approximately a same time as a DL Rx signal transmitted by a parent radio access node, or a UL receive (Rx) transmitted by the child radio access node at approximately a same time as a DL Rx signal transmitted by the radio access node.

Example 49 is a method according to example 48, wherein the downlink (DL) and uplink (UL) receive sources are configured using one or more selected from a group consisting of: frequency division multiplexing (FDM); and time division multiplexing (TDM).

Example 50 is a method according to anyone of examples 48 or 49, wherein the timing offset is a timing difference between a DL transmit time associated with the radio access node and a UL receive time associated with the radio access node.

Example 51 is a method according to any one of examples 48 to 50, wherein the radio access node includes multiple radio frequency (RF) front ends and wherein the radio access node applies different analog spatial beamformers for receive signals transmitted by a second, parent child radio access node and the third, child radio access node.

Example 52 is a method according to any one of examples 48 to 51, further including: signaling or causing to signal that the DL TA value of the child radio access node is configured to be associated with the UL TA value of the child radio access node.

Example 53 is a method according to any one of examples 48 to 52, further including: signaling or causing to signal that the DL TA value of the child radio access node is configured to be associated with the UL TA value of the child radio access node and the timing offset.

Example 54 is a method according to any one of examples 48 to 53, wherein a method of downlink (DL) transmission timing for an radio access node, e.g. an integrated access and backhaul (IAB) node in a fifth generation (5G) or new radio (NR) network, includes: configuring or causing to configure downlink (DL) and uplink (UL) receive sources of a radio access node and a child radio access node, wherein the child radio access node is a child IAB node of the radio access node; sharing or causing to share a radio frequency (RF) receiver by the radio access node and the child radio access node; determining or causing to determine a DL timing adjustment (TA) value for the child radio access node using a timing adjustment group (TAG); and receiving or causing to receive one selected from a group consisting of: a UL receive (Rx) transmitted by the child radio access node at approximately a same time as a DL Rx signal transmitted by a second, parent radio access node, e.g. a next generation NodeB (gNB), or a UL receive (Rx) transmitted by the child radio access node at approximately a same time as a DL Rx signal transmitted by the radio access node.

Example 55 is a method according to any one of examples 48 to 54, further including: signaling or causing to signal that the DL TA value of the child radio access node is configured to be independent of a UL TA value of the child radio access node.

Example 56 is an apparatus for use in downlink (DL) transmission timing for the radio access node, e.g. an integrated access and backhaul (IAB) node in a fifth generation (5G) or new radio (NR) network, includes: a means for configuring DL and uplink (UL) receive sources of a radio access node and for a child radio access node, e.g. the child radio access node is a child IAB node of the radio access node; means for sharing a radio frequency (RF) receiver by the radio access node and the child radio access node; means for determining a DL timing adjustment (TA) value for the child radio access node based on one or more selected from a group consisting of: a UL timing adjustment (TA) value of the child radio access node, and a timing offset; and means for receiving one selected from a group consisting of: a UL receive (Rx) transmitted by the child radio access node at approximately a same time as a DL Rx signal transmitted by a second, parent radio access node, e.g. a next generation NodeB (gNB), or a UL receive (Rx) transmitted by the child radio access node at approximately a same time as a DL Rx signal transmitted by the radio access node.

Example 57 is an apparatus of example 56, wherein the DL and uplink (UL) receive sources are configured using one or more selected from a group consisting of: frequency division multiplexing (FDM); and time division multiplexing (TDM).

Example 58 is an apparatus of example 56 or 57, wherein the timing offset is a timing difference between a DL transmit time associated with the radio access node and a UL receive time associated with the radio access node.

Example 59 is an apparatus of any one of example 56 to 58, wherein the radio access node includes multiple radio frequency (RF) front ends and wherein the radio access node applies different analog spatial beamformers for receive signals transmitted by a second, parent radio access node, e.g. a donor next generation NodeB (gNB), and the child radio access node.

Example 60 is an apparatus of any one of example 56 to 59, further including: a means for signaling that the DL TA value of the child radio access node is configured to be associated with the UL TA value of the child radio access node IAB.

Example 61 is an apparatus of any one of example 56 to 60, further including: means for signaling that the DL TA value of the child radio access node is configured to be associated with the UL TA value of the child radio access node and the timing offset.

Example 62 is an apparatus for use in downlink (DL) transmission timing for a radio access node, e.g. an integrated access and backhaul (IAB) node in a fifth generation (5G) or new radio (NR) network, including: means for configuring DL and uplink (UL) receive sources of a radio access node and a child radio access node, the child radio access node may be a child IAB node of the radio access node; means for sharing a radio frequency (RF) receiver by the radio access node and the child radio access node; means for determining a DL timing adjustment (TA) value for the child radio access node using a timing adjustment group (TAG); and means for receiving one selected from a group consisting of: a UL receive (Rx) transmitted by the child radio access node at approximately a same time as a DL Rx signal transmitted by a second, parent radio access node, e.g.

a next generation NodeB (gNB), or a UL receive (Rx) transmitted by the child radio access node at approximately a same time as a DL Rx signal transmitted by the radio access node.

Example 63 is an apparatus of example 62, further including: means for signaling that the DL TA value of the child radio access node is configured to be independent of a UL TA value of the child radio access node.

Example 64 is an apparatus for use in downlink (DL) transmission timing for a radio access node, e.g. an integrated access and backhaul (IAB) node in a fifth generation (5G) or new radio (NR) network, the apparatus configured to: configure DL and uplink (UL) receive sources of a radio access node and for a child radio access node, the child radio access node may be a child IAB node of the radio access node; share a radio frequency (RF) receiver by the radio access node and child radio access node; determine a DL timing adjustment (TA) value for the child radio access node based on one or more selected from a group consisting of: a UL timing adjustment (TA) value of the child radio access node, and a timing offset: and receive one selected from a group consisting of: a UL receive (Rx) transmitted by the child radio access node at approximately a same time as a DL Rx signal transmitted by a second, parent radio access node, e.g. a next generation NodeB (gNB), or a UL receive (Rx) transmitted by the child radio access node at approximately a same time as a DL Rx signal transmitted by the radio access node.

Example 65 is an apparatus according to example 64, wherein the DL and uplink (UL) receive sources are configured using one or more selected from a group consisting of: frequency division multiplexing (FDM); and time division multiplexing (TDM).

Example 66 is an apparatus of example 64 or 65, wherein the timing offset is a timing difference between a DL transmit time associated with the radio access node and a UL receive time associated with the radio access node.

Example 67 is an apparatus of any one of example 64 to 66 wherein the radio access node includes multiple radio frequency (RF) front ends and wherein the radio access node applies different analog spatial beamformers for receive signals transmitted by a second, parent radio access node, e.g. a donor next generation NodeB (gNB), and the child radio access node.

Example 68 is an apparatus of any one of example 64 to 67, further configured to: signal that the DL TA value of the third, child radio access node is configured to be associated with the UL TA value of the child radio access node.

Example 69 is an apparatus of any one of example 64 to 68, further configured to: signal that the DL TA value of the child radio access node is configured to be associated with the UL TA value of the child radio access node and the timing offset.

Example 70 is an apparatus for use in downlink (DL) transmission timing for an integrated access and backhaul (IAB) node in a fifth generation (5G) or new radio (NR) network, the apparatus configured to: configure DL and uplink (UL) receive sources of a radio access node and a child radio access node, e.g. the child radio access node may be a child radio access node of the radio access node; share a radio frequency (RF) receiver by the radio access node and the child radio access node; determine a DL timing adjustment (TA) value for the child radio access node using a timing adjustment group (TAG); and receive one selected from a group consisting of: a UL receive (Rx) transmitted by the child radio access node at approximately a same time as a DL Rx signal transmitted by a parent radio access node, e.g. a next generation NodeB (gNB), or a UL receive (Rx) transmitted by the child radio access node at approximately a same time as a DL Rx signal transmitted by the radio access node.

Example 71 is an apparatus according to example 70, further configured to: signal that the DL TA value of the child radio access node is configured to be independent of a UL TA value of the child radio access node.

Example 72 is an apparatus including means to perform one or more elements of a method described in or related to any of examples 1-71, or any other method or process described herein.

Example 73 is a radio access node, including: a receiver configured to receive a request transmitted by a first radio access node for the radio access node to perform a timing advance adjustment, so that an uplink receive signal transmitted by the radio access node arrives at about a predetermined time at the first radio access node; one or more processors configured to perform a timing advance adjustment based on a received request, so that an uplink receive signal transmitted by the radio access node arrives at about the predetermined timing at the first radio access node; and a memory storing the request.

Example 74 is an radio access node including means to perform one or more elements of a method described in or related to any of examples 1-73, or any other method or process described herein.

Example 75 is a non-transitory computer-readable media, wherein one or more non-transitory computer-readable media include instructions to cause an electronic device, upon execution of the instructions by one or more processors of the electronic device, to perform one or more elements of a method described in or related to any of examples 1-74, or any other method or process described herein.

Example 76 is an apparatus according to any of the above describes examples wherein the apparatus includes logic, modules, or circuitry to perform one or more elements of a method described in or related to any of examples 1-73, or any other method or process described herein.

Example 77 is a radio access node or an electronic device according to any one of examples 1 to 74, further including: one or more processors and one or more computer-readable media including instructions that, when executed by the one or more processors, cause the one or more processors to perform the method, techniques, or process as described in or related to any of examples 1-74, or portions thereof.

Example 78 is an apparatus according to any one of examples 1 to 75, wherein the apparatus or any portion thereof is implemented in or by a user equipment (UE).

Example 79 is an apparatus according to any one of examples 1 to 75, wherein the apparatus or any portion thereof is implemented in or by a base station (BS).

Any of the above-described examples may be combined with any other example (or combination of examples), unless explicitly stated otherwise. The foregoing description of one or more implementations provides illustration and description, but is not intended to be exhaustive or to limit the scope of aspects to the precise form disclosed. Modifications and variations are possible in light of the above teachings or may be acquired from practice of various aspects. Any of the above-described examples may be combined with any other example (or combination of examples), unless explicitly stated otherwise. The foregoing description of one or more implementations provides illustration and description, but is not intended to be exhaustive or to limit the scope of aspects to the precise form disclosed.

Modifications and variations are possible in light of the above teachings or may be acquired from practice of various aspects.

Terminology

For the purposes of the present document, the following terms and definitions are applicable to the examples and aspects discussed herein.

The term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some aspects, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these aspects, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. The terms "application circuitry" and/or "baseband circuitry" may be considered synonymous to, and may be referred to as, "processor circuitry."

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized network function (VNF), NFV infrastructure (NFVI), and/or the like.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "appliance", "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "resource" as used herein refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with and/or equivalent to "communications channel", "data communications channel," "transmission channel," "data transmission channel," "access channel", "data access channel," "link," "data link", "carrier", "radiofrequency carrier," and/or any other like term denoting a pathway or medium through which data is communicated. Additionally, the term "link" as used herein refers to a connection between two devices through a radio access technology (RAT) for the purpose of transmitting and receiving information.

The terms "instantiate," "instantiation," and the like as used herein refers to the creation of an instance. An "instance" also refers to a concrete occurrence of an object, which may occur, for example, during execution of program code.

The terms "coupled", "communicatively coupled," along with derivatives thereof are used herein. The term "coupled"

may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

The term "information element" refers to a structural element containing one or more fields. The term "field" refers to individual contents of an information element, or a data element that contains content.

The term "SMTC" refers to an synchronization signal block (SS/PBCH Block) (SSB)-based measurement timing configuration configured by SSB-MeasurementTimingConfiguration.

The term "SSB" refers to an synchronization signal/physical broadcast channel (SS/PBCH) block.

The term "a "Primary Cell" refers to the master cell group (MCG) cell, operating on the primary frequency, in which the UE either performs the initial connection establishment procedure or initiates the connection re-establishment procedure.

The term "Primary SCG Cell" refers to the secondary cell group (SCG) cell in which the UE performs random access when performing the Reconfiguration with Sync procedure for dual connectivity (DC) operation.

The term "Secondary Cell" refers to a cell providing additional radio resources on top of a Special Cell for a UE configured with CA.

The term "Secondary Cell Group" refers to the subset of serving cells including the Primary SCell (PSCell) and zero or more secondary cells for a UE configured with DC.

The term "Serving Cell" refers to the primary cell for a UE in RRC_CONNECTED not configured with CA/DC there is only one serving cell including of the primary cell.

The term "serving cell" or "serving cells" refers to the set of cells including the Special Cell(s) and all secondary cells for a UE in RRC_CONNECTED configured with CA/.

The term "Special Cell" refers to the PCell of the MCG or the PSCell of the SCG for DC operation; otherwise, the term "Special Cell" refers to the Pcell.

While the invention has been particularly shown and described with reference to specific aspects, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. An apparatus comprising:
one or more processors configured to cause a radio access node to:
receive an uplink timing advance from a parent radio access node for a first communication between the radio access node and the parent radio access node;
receive an additional timing offset value from the parent radio access node for a second communication between the radio access node and one or more of a child radio access node and a user equipment (UE);
transmit a downlink transmission to the one or more of the child radio access node and the UE based on the uplink timing advance and the additional timing offset; and
apply different analog spatial beamformers for receive signals transmitted by the parent radio access node and the child radio access node.

2. The apparatus according to claim 1,
wherein the radio access node is integrated in a 5G communication network, and the downlink transmission is a signal of the 5G communication network.

3. The apparatus according to claim 1,
wherein the apparatus comprises at least one receiver configured to receive signals transmitted by the parent radio access node and the child radio access node.

4. The apparatus according to claim 1,
wherein the uplink timing advance is received from the parent radio access node via UE-specific signaling.

5. The apparatus according to claim 1,
wherein the radio access node is a base station.

6. The apparatus according to claim 1,
wherein the radio access node is an integrated access and backhaul node.

7. The apparatus according to claim 1,
wherein the downlink transmission timing of the radio access node is aligned with the downlink transmission timing of the parent radio access node.

8. The apparatus according to claim 1, wherein the one or more processors is configured to cause the radio access node to:
transmit a second downlink transmission to the user equipment based on the uplink timing advance and the additional timing offset.

9. A method comprising:
receiving an uplink timing advance from a parent radio access node for a first communication between a radio access node and the parent radio access node;
receiving an additional timing offset value from the parent radio access node for a second communication between the radio access node and one or more of a child radio access node and a user equipment (UE);
transmitting a downlink transmission to the one or more of the child radio access node and the UE based on the uplink timing advance and the additional timing offset; and
applying different analog spatial beamformers for receive signals transmitted by the parent radio access node and the child radio access node.

10. The method according to claim 9,
wherein the radio access node is integrated in a 5G communication network, and the downlink transmission is a signal of the 5G communication network.

11. The method according to claim 9,
wherein the uplink timing advance is received from the parent radio access node via UE-specific signaling.

12. The method according to claim 9,
wherein the radio access node is a base station.

13. The method according to claim 9,
wherein the radio access node is an integrated access and backhaul node.

14. The method according to claim 9, further comprising:
transmitting a second downlink transmission to the user equipment based on the uplink timing advance and the additional timing offset.

15. A non-transitory memory medium storing program instructions, wherein the instructions, when executed by one or more processors, cause a radio access node to:
- receive an uplink timing advance from a parent radio access node for a first communication between the radio access node and the parent radio access node;
- receive an additional timing offset value from the parent radio access node for a second communication between the radio access node and one or more of a child radio access node and a user equipment (UE);
- transmit a downlink transmission to the one or more of the child radio access node and the UE based on the uplink timing advance and the additional timing offset; and
- applying different analog spatial beamformers for receive signals transmitted by the parent radio access node and the child radio access node.

16. The non-transitory memory medium of claim 15, wherein the uplink timing advance is received from the parent radio access node via UE-specific signaling.

17. The non-transitory memory medium of claim 15, transmitting a second downlink transmission to the user equipment based on the uplink timing advance and the additional timing offset.

\* \* \* \* \*